(12) United States Patent
Iwano

(10) Patent No.: US 10,916,126 B2
(45) Date of Patent: Feb. 9, 2021

(54) DRIVING ASSISTANCE APPARATUS, IMAGING APPARATUS, IMAGING SYSTEM, DRIVING ASSISTANCE SYSTEM, VEHICLE, AND DRIVING ASSISTANCE METHOD

(71) Applicant: KYOCERA Corporation, Kyoto (JP)

(72) Inventor: Shota Iwano, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 157 days.

(21) Appl. No.: 16/314,589

(22) PCT Filed: Jun. 28, 2017

(86) PCT No.: PCT/JP2017/023771
§ 371 (c)(1),
(2) Date: Dec. 31, 2018

(87) PCT Pub. No.: WO2018/003866
PCT Pub. Date: Jan. 4, 2018

(65) Prior Publication Data
US 2019/0318619 A1    Oct. 17, 2019

(30) Foreign Application Priority Data

Jun. 29, 2016 (JP) .............................. 2016-128720
Apr. 26, 2017 (JP) .............................. 2017-087721

(51) Int. Cl.
| | |
|---|---|
| G08G 1/01 | (2006.01) |
| B60R 1/00 | (2006.01) |
| G06K 9/00 | (2006.01) |
| G08G 1/09 | (2006.01) |
| H04N 7/18 | (2006.01) |

(52) U.S. Cl.
CPC ............. *G08G 1/0125* (2013.01); *B60R 1/00* (2013.01); *G06K 9/00805* (2013.01); *G08G 1/0112* (2013.01); *G08G 1/09* (2013.01); *H04N 7/183* (2013.01)

(58) Field of Classification Search
CPC ...... G08G 1/0125; G08G 1/0112; G08G 1/09; B60R 1/00; G06K 9/00805; H04N 7/183
USPC ..................................................... 701/117
See application file for complete search history.

(56) References Cited

U.S. PATENT DOCUMENTS

| | | | |
|---|---|---|---|
| 10,248,120 B1 * | 4/2019 | Siegel ................ | G01C 21/3407 |
| 2005/0125121 A1 | 6/2005 | Isaji et al. | |
| 2010/0169009 A1 | 7/2010 | Breed et al. | |
| 2015/0332103 A1 | 11/2015 | Yokota et al. | |
| 2016/0009276 A1 * | 1/2016 | Moeller ................ | B60W 50/14 |
| | | | 701/41 |
| 2018/0186366 A1 * | 7/2018 | Gordon ................ | B60W 30/09 |
| 2018/0307245 A1 * | 10/2018 | Khawaja .............. | G05D 1/0022 |

(Continued)

FOREIGN PATENT DOCUMENTS

| | | |
|---|---|---|
| JP | 2002-288795 A | 10/2002 |
| JP | 2005-182753 A | 7/2005 |
| JP | 2006-113836 A | 4/2006 |

(Continued)

*Primary Examiner* — Gertrude Arthur Jeanglaude
(74) *Attorney, Agent, or Firm* — Studebaker & Brackett PC

(57) ABSTRACT

A driving assistance apparatus includes a communication interface and a processor. The communication interface acquires information related to the position of a vehicle and road information related to a road. The processor determines whether the road is passable based on the acquired information.

24 Claims, 16 Drawing Sheets

(56) References Cited

U.S. PATENT DOCUMENTS

2019/0095725 A1* 3/2019 Kalghatgi .......... G06K 9/00791

FOREIGN PATENT DOCUMENTS

| JP | 2006-154967 A | 6/2006 |
| JP | 2008-174023 A | 7/2008 |
| JP | 2012-113431 A | 6/2012 |
| JP | 2016-001170 A | 1/2016 |
| JP | 2016-031570 A | 3/2016 |

* cited by examiner

FIG. 11

| Position P (distance x (m) from reference position) | Road width W1 (m) | Object width W2 (m) | Passable width W3 (m) | Steering angle (°) |
|---|---|---|---|---|
| 0 | 4.0 | 0 | 4.0 | 0 |
| 2 | 4.0 | 1.0 | 3.0 | 0 |
| 4 | 8.0 | 0 | 8.0 | 0 |
| 6 | 8.0 | 0 | 8.0 | 0 |
| 8 | 8.0 | 0 | 8.0 | 0 |
| 10 | 3.5 | 0 | 3.5 | 30 |
| 12 | 3.0 | 0.5 | 2.5 | 0 |
| 14 | 4.0 | 0 | 4.0 | -30 |

DRIVING ASSISTANCE APPARATUS, IMAGING APPARATUS, IMAGING SYSTEM, DRIVING ASSISTANCE SYSTEM, VEHICLE, AND DRIVING ASSISTANCE METHOD

CROSS-REFERENCE TO RELATED APPLICATION

The present application claims priority to and the benefit of Japanese Patent Application No. 2016-128720 filed Jun. 29, 2016 and Japanese Patent Application No. 2017-087721 filed Apr. 26, 2017, the entire contents of which are incorporated herein by reference.

TECHNICAL FIELD

The present disclosure relates to a driving assistance apparatus, an imaging apparatus, an imaging system, a driving assistance system, a vehicle, and a driving assistance method.

BACKGROUND

A known apparatus and system assist with driving of a vehicle on the road by providing information related to obstacles with which the vehicle may come into contact.

For example, when a vehicle drives on a narrow road, the conventional vehicle driving assistance apparatus determines whether the vehicle can pass by an object, such as a parked car, based on the width of the vehicle and the object width.

SUMMARY

A driving assistance apparatus of the present disclosure includes a communication interface and a processor. The communication interface acquires information related to the position of a vehicle and road information related to a road. The processor determines whether the road is passable based on the acquired information.

An imaging apparatus of the present disclosure includes a lens, an image sensor, and a driving assistance apparatus. The driving assistance apparatus includes a communication interface and a processor. The communication interface acquires information related to the position of a vehicle and road information related to a road. The processor determines whether the road is passable based on the information related of the vehicle to the position and the road information.

An imaging system of the present disclosure is for mounting in a vehicle and includes a position sensor, an imaging apparatus, and a driving assistance apparatus. The position sensor outputs information related to a position of the vehicle. The imaging apparatus captures an image of a road on which the vehicle is driving and outputs road information related to the road. The driving assistance apparatus includes a communication interface and a processor. The communication interface acquires the information related to the position of the vehicle and the road information. The processor determines whether the road is passable based on the information related to the position of the vehicle and the road information.

A driving assistance system of the present disclosure includes a plurality of driving assistance apparatuses mounted in a plurality of vehicles and an information processing apparatus external to the plurality of vehicles. Each of the driving assistance apparatus of the plurality of driving assistance apparatuses includes an information acquisition unit, a first processor, and a first communication unit. The information acquisition unit acquires information related to a position of the vehicle in which each of the driving assistance apparatuses is mounted and driving path information related to a road on which the vehicle is driving. The first processor generates first information indicating the position of the vehicle and generates second information based on the driving path information. The first communication unit transmits the first information to the information processing apparatus in response to control by the first processor, receives nearby road information related to a nearby road near the position of the vehicle as third information, and transmits the second information to the information processing apparatus. The first processor generates information related to whether the nearby road is passable based on the third information. The information processing apparatus includes a second communication unit, a storage, and a second processor. The second communication unit receives the first information and the second information from a vehicle and transmits the third information to the vehicle of the plurality of vehicles. The storage stores a plurality of positions and nearby road information corresponding to each of the plurality of positions as fourth information. The second processor acquires the first information from the second communication unit, and based on the position of the vehicle included in the first information, extracts the nearby road information related to the nearby road as the third information from the fourth information stored in the storage. The second processor updates the fourth information stored in the storage based on the first information and the second information received from the each driving assistance apparatus.

A vehicle of the present disclosure includes a driving assistance apparatus. The driving assistance apparatus includes a communication interface and a processor. The communication interface acquires information related to the position of the vehicle and road information related to a road. The processor determines whether the road is passable based on the information related to the position and the road information.

A driving assistance method of the present disclosure is for execution by a driving assistance apparatus. The driving assistance apparatus acquires information related to a position of a vehicle and road information related to a road. The driving assistance apparatus determines whether the road is passable based on the information related to the position and the road information.

BRIEF DESCRIPTION OF THE DRAWINGS

In the accompanying drawings:

FIG. 11 is a conceptual diagram illustrating an example of driving history stored by a memory;

DETAILED DESCRIPTION

With a known technique, it may be difficult for a vehicle to drive on a narrow road. The determination that the vehicle cannot pass by an object, for example, can only be made when the vehicle actually drives down a narrow road and encounters the object. Hence, it is hard to acquire information on narrow, hard to travel roads in advance to avoid entering or approaching such roads. When a vehicle proceeds down a narrow road and could come into contact with an oncoming car, for example, it is difficult to retreat to a suitable location for the vehicles to pass each other.

In light of these considerations, the present disclosure aims to provide a driving assistance apparatus, an imaging apparatus, an imaging system, a driving assistance system, a vehicle, and a driving assistance method that reduce the difficulty of driving on a narrow road.

A driving assistance apparatus, an imaging apparatus, an imaging system, a driving assistance system, a vehicle, and a driving assistance method according to embodiments of the present disclosure can reduce the difficulty of driving on a narrow road.

First Embodiment

A first embodiment of the present disclosure is now described with reference to the drawings.

Figure 1:
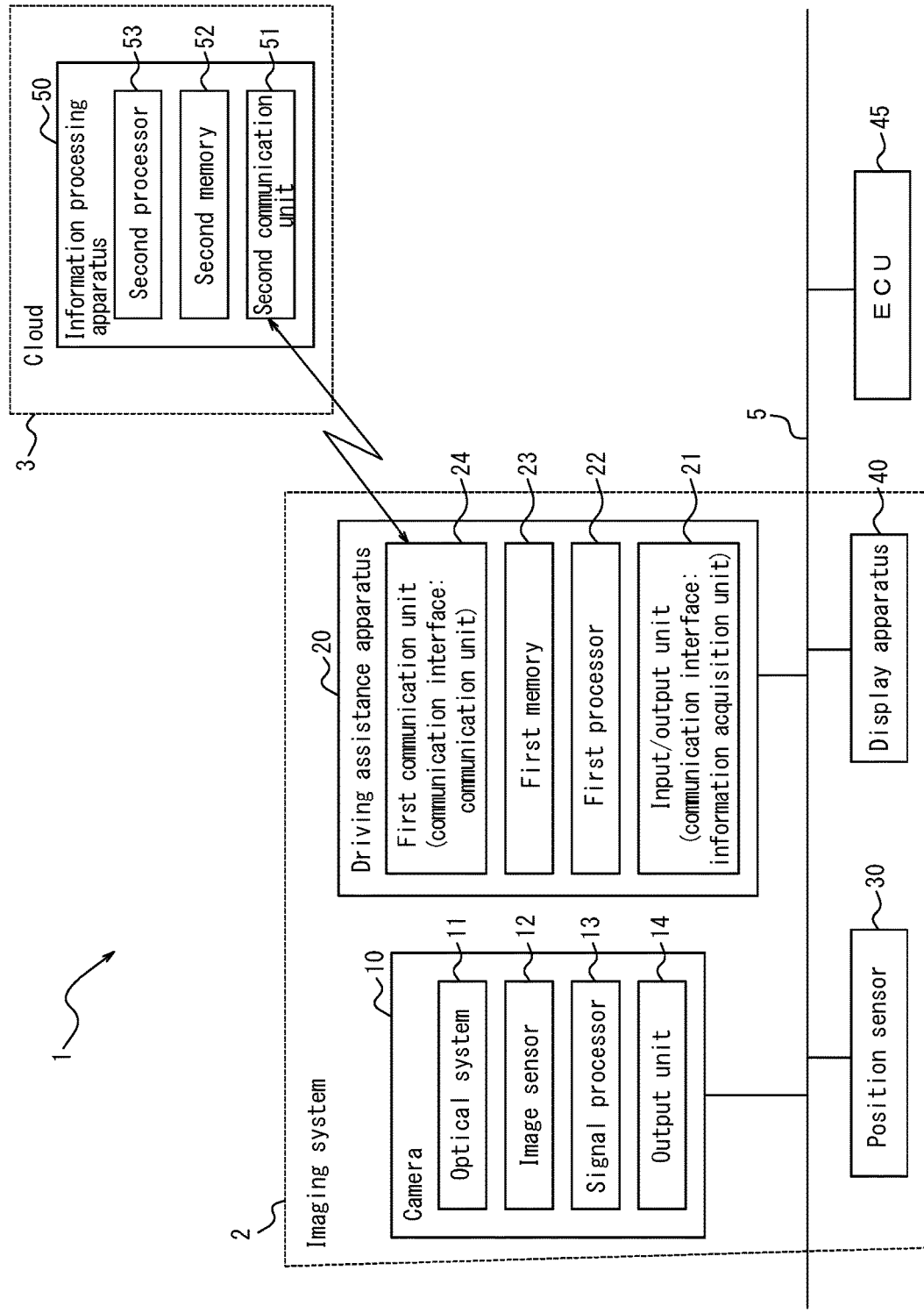
FIG. 1 is a block diagram illustrating the schematic configuration of a driving assistance system of a first embodiment.

As illustrated in FIG. 1, a driving assistance system 1 according to an embodiment includes a driving assistance apparatus 20 and an information processing apparatus 50. A plurality of driving assistance apparatuses 20 are included in correspondence with the information processing apparatus 50. Only one of the driving assistance apparatuses 20 is illustrated in FIG. 1. For example, hundreds to millions of driving assistance apparatuses 20 may exist in correspondence with the information processing apparatus 50. In addition to the driving assistance apparatuses 20 and the information processing apparatus 50, the driving assistance system 1 may include a camera 10, which is an imaging apparatus, and a position sensor 30 as an information acquisition unit. Furthermore, the driving assistance system 1 may include a display apparatus 40. An imaging system 2 includes the camera 10, the driving assistance apparatus 20, and the position sensor 30. The imaging system 2 may also include the display apparatus 40. The information processing apparatus 50 may be located on a cloud computing system of a provider.

Figure 2:
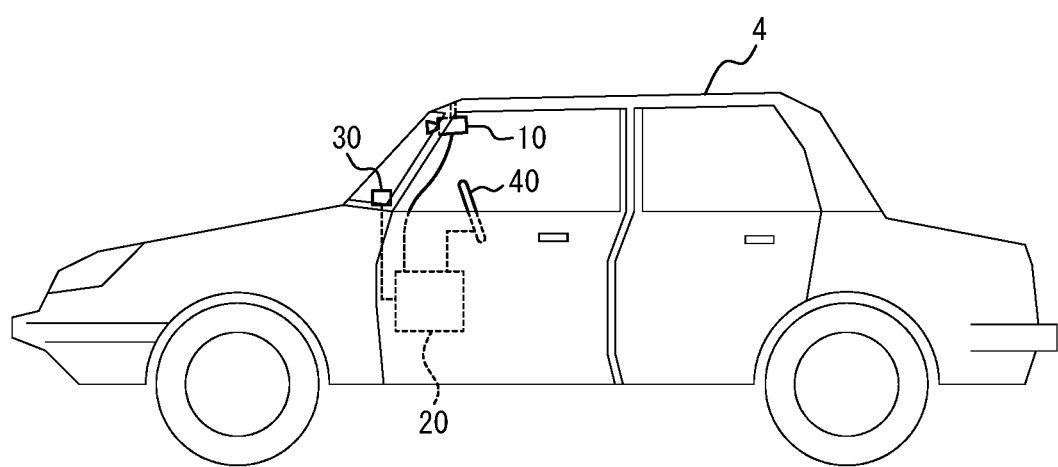
FIG. 2 illustrates the schematic configuration of a driving assistance apparatus mounted in a vehicle.

The camera 10, the driving assistance apparatus 20, the position sensor 30, and the display apparatus 40 are mounted in a vehicle 4, as illustrated in FIG. 2. The camera 10, the driving assistance apparatus 20, the position sensor 30, and the display apparatus 40 may be connected to each other over a network 5 in the vehicle 4, such as communication cables or a control area network (CAN).

The "vehicle" in the present disclosure encompasses, but is not limited to, automobiles and industrial vehicles. For example, the term "vehicle" may include airplanes that travel down a runway. Examples of automobiles include, but are not limited to, passenger vehicles, trucks, buses, motorcycles, and trolley buses, and may include other vehicles that travel on the road. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. Power engines for the vehicle include, but are not limited to, internal-combustion engines including diesel engines, gasoline engines, and hydrogen engines, and electrical engines including motors. The term "vehicle" includes human-powered vehicles. The vehicle is not limited to the above-listed types. For example, automobiles may include industrial vehicles that can drive on the road, and the same vehicle may be included in multiple categories.

The camera 10 is installed to capture images of the driving path ahead of the vehicle 4. In an embodiment, the camera 10 is located in the cabin of the vehicle 4 and can capture images of the outside of the vehicle 4 through the windshield of the vehicle 4. In another embodiment, the camera 10 may be fixed to any of the front bumper, the fender grills, the side fenders, the light modules, and the hood (bonnet) of the vehicle 4.

As illustrated in FIG. 1, the camera 10 includes an optical system 11, an image sensor 12, a signal processor 13, an output unit 14, and the like.

The optical system 11 is a lens that focuses light incident on the optical system 11 to form an image on the image sensor 12. The optical system 11 may, for example, be configured by a fisheye lens or a super wide-angle lens. The optical system 11 may be configured by a single lens or by a plurality of lenses.

The image sensor 12 is an image sensor that captures an image formed by the optical system 11. The image sensor 12 includes a charge-coupled device (CCD) image sensor or a complementary metal oxide semiconductor (CMOS) image sensor. The image sensor 12 can convert the image formed by the optical system 11 to an electric signal and acquire the electric signal.

The signal processor 13 is one or a plurality of processors that process the electric signal of the image acquired by the image sensor 12. The processor in the signal processor 13 is, for example, a dedicated microprocessor formed to execute particular functions or a processor that executes particular functions by reading particular programs.

The signal processor 13 generates an image signal representing an image from the electric signal acquired by the image sensor 12. The signal processor 13 may perform any process on the image, such as distortion correction, brightness adjustment, contrast adjustment, gamma correction, or the like.

The output unit 14 outputs the image signal generated by the signal processor 13 to the driving assistance apparatus 20. The output unit 14 may include a physical connector, a wireless communication device, or the like. Examples of physical connectors include an electrical connector, an optical connector, and an electromagnetic connector. Examples of wireless communication devices include wireless communication devices that conform to standards such as Bluetooth® (Bluetooth is a registered trademark in Japan, other countries, or both) or IEEE802.11 and antennas. In an embodiment, the output unit 14 can connect to the network 5 of the vehicle 4. The camera 10 can be connected to the driving assistance apparatus 20, the display apparatus 40, and the like through the network 5. The camera 10 and the driving assistance apparatus 20 may also be connected directly, without going through the network 5 of the vehicle 4.

The driving assistance apparatus 20 includes an input/output unit 21 (information acquisition unit), a first processor 22 (processor), a first memory 23, a first communication unit 24 (communication unit), and the like.

Like the output unit 14 of the camera 10, the input/output unit 21 may include a physical connector, a wireless communication device, or the like.

In an embodiment, the input/output unit 21 connects to the network 5 of the vehicle 4 and can receive the image signal outputted by the camera 10 and information related to the position detected by the position sensor 30. The camera 10 captures images of the driving path on which the vehicle 4 is driving. The image signal outputted by the camera 10 indicates road information related to the road. Driving path information related to the road on which the vehicle 4 is driving is included in the road information indicated by the image signal outputted by the camera 10. The driving path information is acquirable while the vehicle 4 is driving and is related to the road on which the vehicle 4 is driving. The driving path information is often acquired in real time. The driving path information in the present embodiment is a captured image of the road being driven on. The driving path information is used for generating the below-described second information. The input/output unit 21 can acquire the acquisition time at which the driving path information was acquired. The acquisition time may be acquired from the camera 10. The acquisition time may also be acquired from a clock included in any apparatus, such as the driving assistance apparatus 20.

The input/output unit 21 can output the information acquired, calculated, or generated by the first processor 22 to the display apparatus 40.

The input/output unit 21 can output warning information from the first processor 22.

The input/output unit 21 functions as an information acquisition unit of the driving assistance apparatus 20. The input/output unit 21 can function as an output unit of the driving assistance apparatus 20. The functional unit including the input/output unit 21 and the first communication unit 24 is referred to as a communication interface.

The first processor 22 controls the driving assistance apparatus 20 overall. The processing performed by the driving assistance apparatus 20 can be regarded as processing performed by the first processor 22. The first processor 22 performs various calculations, judgments, and image processing. The first processor 22 can include a plurality of processors. The term "processor" encompasses universal processors that execute particular functions by reading particular programs and dedicated processors that are specialized for particular processing. Dedicated processors include application specific integrated circuits (ASICs) for specific applications. Processors also include programmable logic devices (PLDs). PLDs include field-programmable gate arrays (FPGAs). The first processor 22 may be either a system-on-a-chip (SoC) or a system in a package (SiP) with one processor or a plurality of processors that work together.

The first processor 22 generates first information indicating the position of the vehicle 4 based on information related to the position acquired from the position sensor 30. The first information can be position coordinates, such as the longitude and latitude of the vehicle 4.

The first processor 22 can transmit a signal to the signal processor 13 of the camera 10 to control activation and deactivation of the camera 10. The first processor 22 generates second information based on the driving path information acquired from the camera 10. The second information includes the road width of the road being driven on. The information that includes the road width is referred to as road width information. The second information includes information indicating whether an object that could obstruct passage is present on the road being driven on. When an object that could obstruct passage is present, the second information can include information on the width of the object (object width). The information including an indication of whether an object is present and the object width is referred to as object information. The first processor 22 can judge whether the object is moving. The object information can include information indicating whether the object is moving. The road width information may include a drivable road width yielded by subtracting the object width from the width of the road being driven on. In other words, the second information includes road width information and object information. The second information may include the acquisition time of the driving path information serving as a basis for the second information.

The first processor 22 can recognize the road and obstacles from the image captured by the camera 10. The first processor 22 can detect a marker on the road (such as a lane marking) and judge the edges of the road. The first processor 22 can detect edges from the image and recognize an object using a method such as pattern matching. The first processor 22 estimates distance from the vertical position in the image and estimates the road width and the object width based on the estimated distance and the number of pixels in the horizontal direction. The first processor 22 may acquire the road width using sonar sensors provided on the sides of the vehicle 4. The first processor 22 can acquire the road width information and the object information with any method, not just the aforementioned methods. For example, the first processor 22 may detect the road width and the object width based on parallax of two images captured by two cameras 10. The camera 10 may therefore be a stereo camera.

The first processor 22 transmits and receives information to and from the external information processing apparatus 50 through the first communication unit 24. The first processor 22 transmits the first information to the information processing apparatus 50 and receives road information as third information. Nearby road information related to the roads near the position of the vehicle 4 is included in the road information received by the first processor 22 through the first communication unit 24. The nearby road information includes road width information and object information associated with a plurality of positions. The nearby road information corresponding to positions on the roads near the vehicle 4 is referred to as third information. As described below, the third information is based on information that is an aggregate of second information acquired by a plurality of vehicles and transmitted to the information processing apparatus 50. The third information may include the acquisition time of the driving path information that served as a basis for the related second information. Apart from the road information and the object information, the third information may include information related to construction, traffic, or the like of the nearby roads. The "nearby roads" include the road being driven on and roads that branch off from the road being driven on. "Nearby" may include a fixed distance range centering on the position of the vehicle 4. The fixed distance range may be set freely. The fixed distance range may be 100 m, 1 km, 10 km, or the like. The fixed distance range can change in accordance with the amount of information acquirable as the third information. "Nearby" may include only roads on which the vehicle 4 might drive.

Based on the third information, the first processor 22 generates information related to whether the nearby roads are passable. The first processor 22 can control images and characters displayed on the display apparatus 40. The first processor 22 can cause the display apparatus 40 to display information related to whether the nearby roads are passable. The first processor 22 may itself judge whether a road is passable. The first processor 22 can cause the display apparatus 40 to display road information to assist the driver of the vehicle 4 in judging whether a road is passable.

Based on third information, the first processor 22 can activate the camera 10 and generate second information. When the first processor 22 judges from the third information that the road width of the road being driven on is less than a predetermined width, or judges that an object might be on the road, the first processor 22 activates the camera 10 and acquires an image of the driving path ahead. The first processor 22 may generate second information using the image from the camera 10 and transmit the second information along with the first information to the information processing apparatus 50 through the first communication unit 24.

The first processor 22 may activate the camera 10 without referring to the third information. The first processor 22 may activate the camera 10 when judging that the road width has narrowed based on information other than the third information. For example, when the change per unit of time in the position information from the position sensor 30 decreases, the first processor 22 can judge that the vehicle 4 might be decelerating because the road width has decreased. In this case as well, the first processor 22 generates second information and transmits the second information to the information processing apparatus 50. The first processor 22 may active the camera 10 and generate the first information when the first processor 22 receives a signal, related to a driving operation that is distinctive of a narrowed road width, from an electronic control unit (ECU) 45 of various apparatuses mounted in the vehicle 4. Examples of such a driving operation include a braking operation and a steering operation by the driver of the vehicle 4. The first processor 22 may deactivate the camera 10 and suspend generation of the second information when the road width of the road being driven on as acquired from the camera 10 becomes greater than a predetermined value.

The first memory 23 stores programs for various processing performed by the first processor 22 and data during calculations. The first memory 23 includes volatile memory and/or non-volatile memory. The first memory 23 may be a memory independent from the processor and/or a memory built into the processor. The first memory 23 stores information for judging whether a road is passable, such as information on the width of the respective vehicle 4.

The first communication unit 24 is a communication unit that communicates with the information processing apparatus 50 over a network, such as the Internet. The first communication unit 24 includes means for communicating with the outside of the vehicle 4. The first communication unit 24 includes a wireless communication device conforming to standards such as Bluetooth®, dedicated short range communications (DSRC®), IEEE802.11, global system for mobile communications (GSM®), long term evolution (LTE®), and/or worldwide interoperability for microwave access (WiMAX®) (DSRC, GSM, LTE, and WiMAX are registered trademarks in Japan, other countries, or both). The wireless communication device includes at least one antenna.

The first communication unit 24 transmits the first information to the information processing apparatus 50 in response to control by the first processor 22 and is capable of receiving the third information related to the nearby roads of the vehicle 4. The first communication unit 24 can transmit the second information to the information processing apparatus 50 when, based on the third information, the road width is less than a predetermined size and the first processor 22 activates the camera 10.

The position sensor 30 is a sensor that is mounted in the vehicle 4 and detects the position of the vehicle 4. The position sensor 30 detects the absolute position. The latitude and longitude can be included in the absolute position. A global positioning system (GPS) receiver can be adopted as the position sensor 30. A combination of a GPS receiver, a gyro sensor, a vehicle speed sensor, and the like may be used in the position sensor 30. A sensor in a navigation system provided in the vehicle 4 may double as the position sensor 30.

The display apparatus 40 displays information, such as warning information, that is outputted from the input/output unit 21 of the driving assistance apparatus 20. A variety of flat panel displays may be used as the display apparatus 40, such as a liquid crystal display (LCD), an organic electroluminescence (EL) display, an inorganic EL display, a plasma display panel (PDP), a field emission display (FED), an electrophoretic display, or a twist ball display. The display apparatus 40 can be arranged in the dashboard, the instrument panel, or the like of the vehicle 4. A head-up display (HUD) can also be used as the display apparatus 40. When an HUD is used as the display apparatus 40, images can be projected on the front windshield or on a combiner arranged in front of the driver's seat. A display apparatus of another system, such as a navigation system, may double as the display apparatus 40.

The information processing apparatus 50 includes a second communication unit 51, a second memory 52, and a second processor 53. The information processing apparatus 50 may be implemented by a single computer. The information processing apparatus 50 may be implemented by a plurality of computers dispersed on the cloud 3.

The second communication unit 51 communicates with the driving assistance apparatus 20 mounted in a plurality of vehicles, including the vehicle 4. The second communication unit 51 supports the various communication means included in the first communication unit 24. The second communication unit 51 receives the first information and the second information from the vehicle 4. The second communication unit 51 can transmit the third information to the vehicle 4.

The second memory 52 is a storage that stores programs for various processing performed by the second processor 53 and data during calculations. The second memory 52 includes volatile memory and/or non-volatile memory. The second memory 52 may include a memory independent from the second processor 53 or a memory internal to the second processor 53. The second memory 52 can include a mass-storage device that uses magnetic memory, optical memory, or the like. The magnetic memory may, for example, include a hard disk, magnetic tape, or the like. The optical memory may, for example, include a compact disc (CD), a digital versatile disc (DVD), a Blu-ray® (BD) Disc (Blu-ray is a registered trademark in Japan, other countries, or both), or the like. The second memory 52 may be a storage array device, such as a disk array device. The second memory 52 collects and stores positions on the road, along with the road width information and object information for the road corresponding to each position, from numerous vehicles including the vehicle 4. The second memory 52 may also store construction information and traffic information associated with the position on the road. The road width information, object information, and information on construction, traffic, and the like associated with the position on the road and stored in the second memory 52 are referred to as fourth information. The fourth information is regional information for a wide range of positions.

The positions stored as the fourth information can be constrained to positions satisfying a predetermined condition, such as a position where the road width changes to exceed a predetermined value, a position with an obstacle, or a position determined to be difficult to pass based on construction information or traffic information. The positions stored as the fourth information may be arranged at predetermined intervals on the road.

The second processor 53 is a processor that controls the information processing apparatus 50 overall. The processing performed by the information processing apparatus 50 can be regarded as processing performed by the second processor 53. The second processor 53 performs various calculations and judgments and operates the second memory 52. The second processor 53 can include a plurality of processors. The term "processor" encompasses universal processors that execute particular functions by reading particular programs and dedicated processors that are specialized for particular processing. Dedicated processors include ASICs. Processors include PLDs. PLDs include FPGAs. The second processor 53 may be either an SoC or an SiP with one processor or a plurality of processors that work together.

The second processor 53 can acquire the first information of the vehicle 4 through the second communication unit 51. When the first information of the vehicle 4 is acquired, the second processor 53 extracts information corresponding to a plurality of positions near the position of the vehicle 4 as the third information from the fourth information stored in the second memory 52. The second processor 53 transmits the third information to the first communication unit 24 of the driving assistance apparatus 20 in the vehicle 4 through the second communication unit 51.

The second processor 53 can acquire the second information of the vehicle 4 through the second communication unit 51. When the second information is acquired, the second processor 53 updates the fourth information in accordance with the second information and the first information acquired simultaneously with the second information. For example, the second processor 53 updates the road width information for a particular position to the latest information in accordance with the second information. As another example, the second processor 53 stores object information indicating the presence of an object that could obstruct passage at a particular position in accordance with the second information. The second processor 53 may acquire information on construction, traffic, and the like from various information sources and add such information the fourth information in association with the position on the road.

Next, a concrete example of operations of the driving assistance system 1 is described with reference to FIG. 3 and FIG. 4. In the following explanation, the processing performed by the driving assistance apparatus 20 can be replaced by processing performed by the first processor 22. The processing performed by the information processing apparatus 50 can be replaced by processing performed by the second processor 53.

Figure 3:
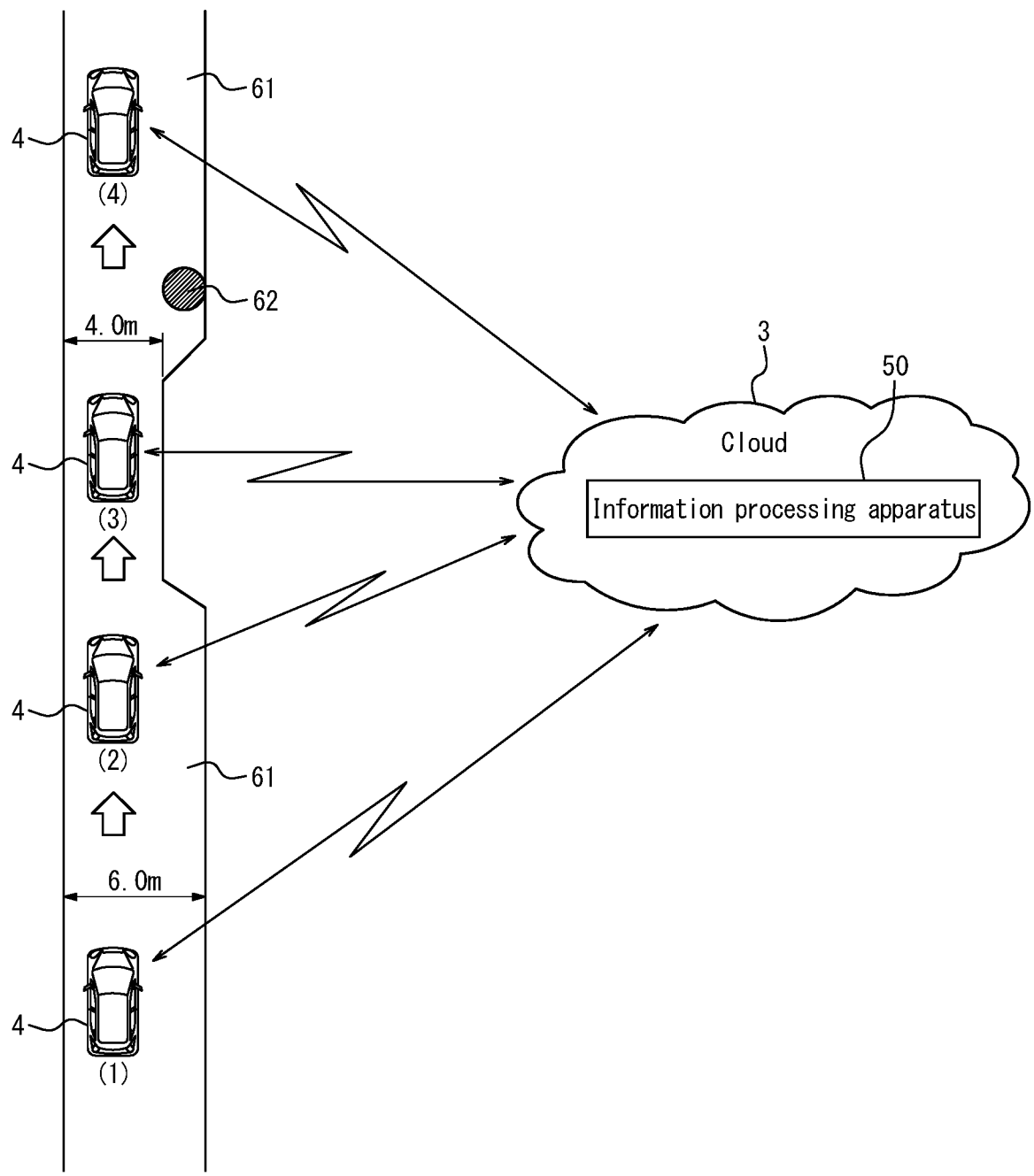
FIG. 3 illustrates processing in a first example of communication between a vehicle driving on a road and an information processing apparatus.

FIG. 3 illustrates the vehicle 4 in a state of driving on a road 61. The vehicle 4 drives from the position indicated by (1) in FIG. 3 to the positions indicated by (2), (3), and (4) sequentially. The road 61 becomes narrow at a certain position. Also, an object 62 is at rest on the road 61.

When the vehicle 4 is at position (1), the driving assistance apparatus 20 transmits the first information to the information processing apparatus 50. Based on the position information in the first information, the information processing apparatus 50 transmits third information that includes road width information of positions near the vehicle 4 to the driving assistance apparatus 20 of the vehicle 4. The information processing apparatus 50 may judge the travel direction of the vehicle 4 based on a change in the position information included in the first information and extract only information of nearby positions ahead of the vehicle 4 from the fourth information. Instead of being determined by the information processing apparatus 50, the travel direction may be included in the first information from the driving assistance apparatus 20.

At position (1), the third information includes road width information that is greater than a predetermined value, such as 5 m. The third information includes information of a position ahead of the vehicle 4 and a road width that is narrower than the predetermined value. The road width ahead of the vehicle 4 is greater than the width of the vehicle 4 stored in the first memory 23. Therefore, the driving assistance apparatus 20 judges that the road 61 is passable. In judging whether the road is passable, the driving assistance apparatus 20 may take into account a safety margin. At this time, the camera 10 of the vehicle 4 is not yet activated. The vehicle 4 drives on the road 61 without operating the camera 10. The driving assistance apparatus 20 may display an indication that the road width becomes narrow ahead on the display apparatus 40.

When the vehicle 4 is at position (2), the first processor 22 recognizes that the point at which the width of the road 61 narrows is nearby based on the third information and causes the camera 10 to start acquiring images. When the vehicle 4 is at position (3), the driving assistance apparatus 20 detects the road width based on an image acquired from the camera 10. Along with the first information, the driving assistance apparatus 20 transmits the detected road width information as the second information to the information processing apparatus 50.

The driving assistance apparatus 20 may continuously transmit the second information to the information processing apparatus 50 without receiving the third information from the information processing apparatus 50 while the camera 10 is activated. Alternatively, the driving assistance apparatus 20 may receive the third information from the information processing apparatus 50 while the camera 10 is activated and transmit the second information only when the width of the road being driven on as included in the third information differs from the width of the road being driven on as detected using the image from the camera 10. The information processing apparatus 50 updates the fourth information included in the second memory 52 based on the received second information. The fourth information is thus maintained up to date.

When the vehicle 4 is at position (3), the driving assistance apparatus 20 can detect an object 62 ahead based on an image from the camera 10. The driving assistance apparatus 20 recognizes the width of the object 62 and subtracts the width of the object 62 from the width of the road 61 to calculate the passable width of the road 61. The width of the road 61, the width of the object 62, the passable road width, and information indicating that the object 62 is at rest are transmitted to the information processing apparatus 50 as second information.

When the vehicle 4 is at position (4), the driving assistance apparatus 20 deactivates the camera 10 and suspends transmission of the second information when the width of the road 61 exceeds a predetermined value for a predetermined time period after passing by the object 62.

Figure 4:
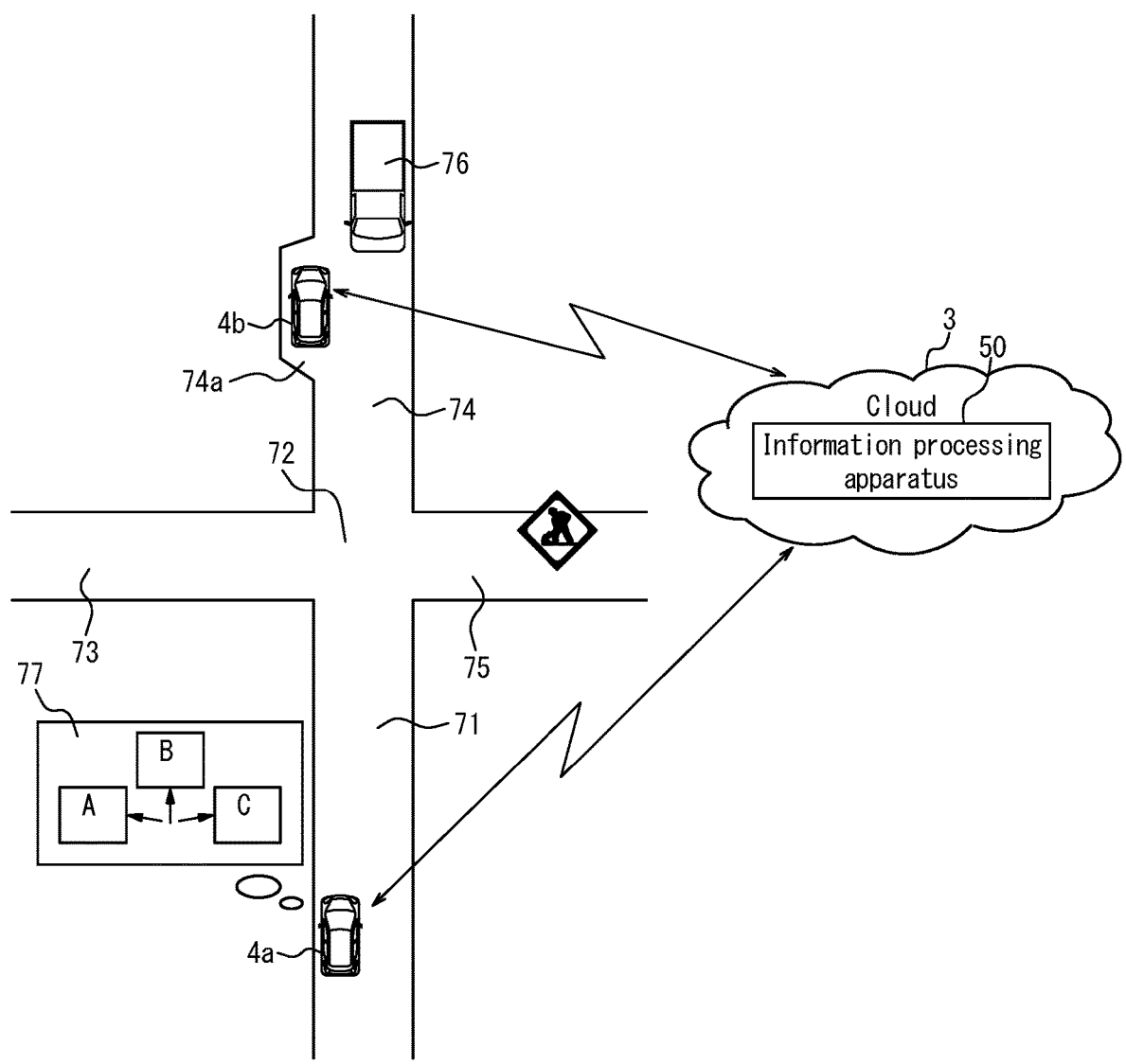
FIG. 4 illustrates processing in a second example of communication between a vehicle driving on a road and an information processing apparatus.

Next, with reference to FIG. 4, another example of operations of the driving assistance system 1 is described. In FIG. 4, a first vehicle 4*a* and a second vehicle 4*b* are different vehicles. The first vehicle 4*a* is driving on a driving path 71. The driving path 71 branches at an intersection 72 into a left-turn path 73, a straight path 74, and a right-turn path 75. The second vehicle 4*b* has been driving on the straight path 74 before the first vehicle 4*a* reaches the intersection 72. The second vehicle 4*b* has met a heavy-duty vehicle 76 and retreated to a retreat space 74*a* on the straight path 74. A construction site is located ahead on the right-turn path 75.

The second vehicle 4*b* that met the heavy-duty vehicle 76 receives a braking operation and a steering operation for retreating to the retreat space 74*a*. The driving assistance apparatus 20 of the second vehicle 4*b* acquires a signal related to these operations from the ECU 45 and activates the camera 10. Based on an image from the camera 10, the driving assistance apparatus 20 of the second vehicle 4*b* acquires the road width of the straight path 74, the width of the heavy-duty vehicle 76, and the passable road width. In this case, the passable road width is assumed to be narrower than the width of the first vehicle 4*a* and the second vehicle 4*b*. The second vehicle 4*b* designates the following information as second information: an indication that the heavy-duty vehicle 76 is present on the straight path 74, an indication that the heavy-duty vehicle 76 is moving, the road width of the straight path 74, the width of the heavy-duty vehicle 76, the passable road width, and the acquisition time at which the heavy-duty vehicle 76 was detected. The second vehicle 4*b* transmits first information, which is position information, and the aforementioned second information to the information processing apparatus 50.

The information processing apparatus 50 receives first information and second information from the second vehicle 4*b* and updates the fourth information stored in the second memory 52. The information processing apparatus 50 acquires information, from an external information source, indicating construction in progress on the right-turn path 75. The information processing apparatus 50 may acquire construction information and information on the passable road width from another vehicle that traveled earlier on the right-turn path 75. The construction information is associated with position information of the construction in progress on the right-turn path and is then stored in the second memory 52 as fourth information.

The driving assistance apparatus 20 of the first vehicle 4*a* that drives on the driving path 71 transmits the first information to the information processing apparatus 50 just before the intersection 72 and acquires the third information from the information processing apparatus 50. In association with a position on the straight path 74, the third information includes object information indicating the presence of the moving heavy-duty vehicle 76, road information including the passable road width, and information on the acquisition time when the heavy-duty vehicle was detected. The driving assistance apparatus 20 can judge, based on the width of the first vehicle 4*a* stored in the first memory 23, that the heavy-duty vehicle 76 might obstruct driving of the respective vehicle. In association with a position on the right-turn path 75, the third information also includes information indicating construction in progress and the passable road width. The third information may include nearby road information associated with other positions on the left-turn path 73, the straight path 74, and the right-turn path 75.

The driving assistance apparatus 20 of the first vehicle 4*a* causes the display apparatus 40 to display warning information through the input/output unit 21 based on the third information. A display screen 77 in FIG. 4 depicts an image displayed by the display apparatus 40. The display apparatus 40 may include a display A for the left-turn path 73, a display B for the straight path 74, and a display C for the right-turn path 75.

The display A indicates the absence of an object that obstructs passage on the left-turn path 73. The display B indicates that a moving object (the heavy-duty vehicle 76) that obstructs passage is present on the straight path 74 and indicates the acquisition time of the moving object. In this case, the driver of the first vehicle 4*a* could look at the display B and judge whether to proceed on the straight path 74. If a long time has elapsed from the acquisition time, the driver could judge that the moving object has already turned at the intersection 72 and is no longer on the straight path 74. If a short time has elapsed from the acquisition time, the driver could judge that the moving object is still on the straight path 74. Such a judgment may be made by the driving assistance apparatus 20 instead of by the driver. In this case, the display B could display "straight travel impossible", "straight travel possible", or the like. When it is determined that the moving object is still on the straight path 74, the driving assistance apparatus 20 may indicate, on the display B, the predicted position at which the moving object will be met if the vehicle proceeds straight at the intersection 72. The display C indicates the existence of a construction site on the right-turn path 75.

In this way, the driving assistance system 1 aggregates second information acquired from a plurality of vehicles 4 on the information processing apparatus 50. The driving assistance apparatus 20 of each vehicle 4 acquires nearby road information from the information processing apparatus 50 regarding the road in the direction the respective vehicle 4 is going to drive. The nearby road information includes road width information, object information, construction information, traffic information, and the like as third information. In this way, a road that is not easily passable or the like can be avoided before the vehicle 4 reaches the point that is not easily passable.

Next, an example of processing executed by the driving assistance apparatus 20 and the information processing apparatus 50 of the driving assistance system 1 according to an embodiment is described with reference to the flowcharts in FIG. 5 through FIG. 8.

Figure 5:
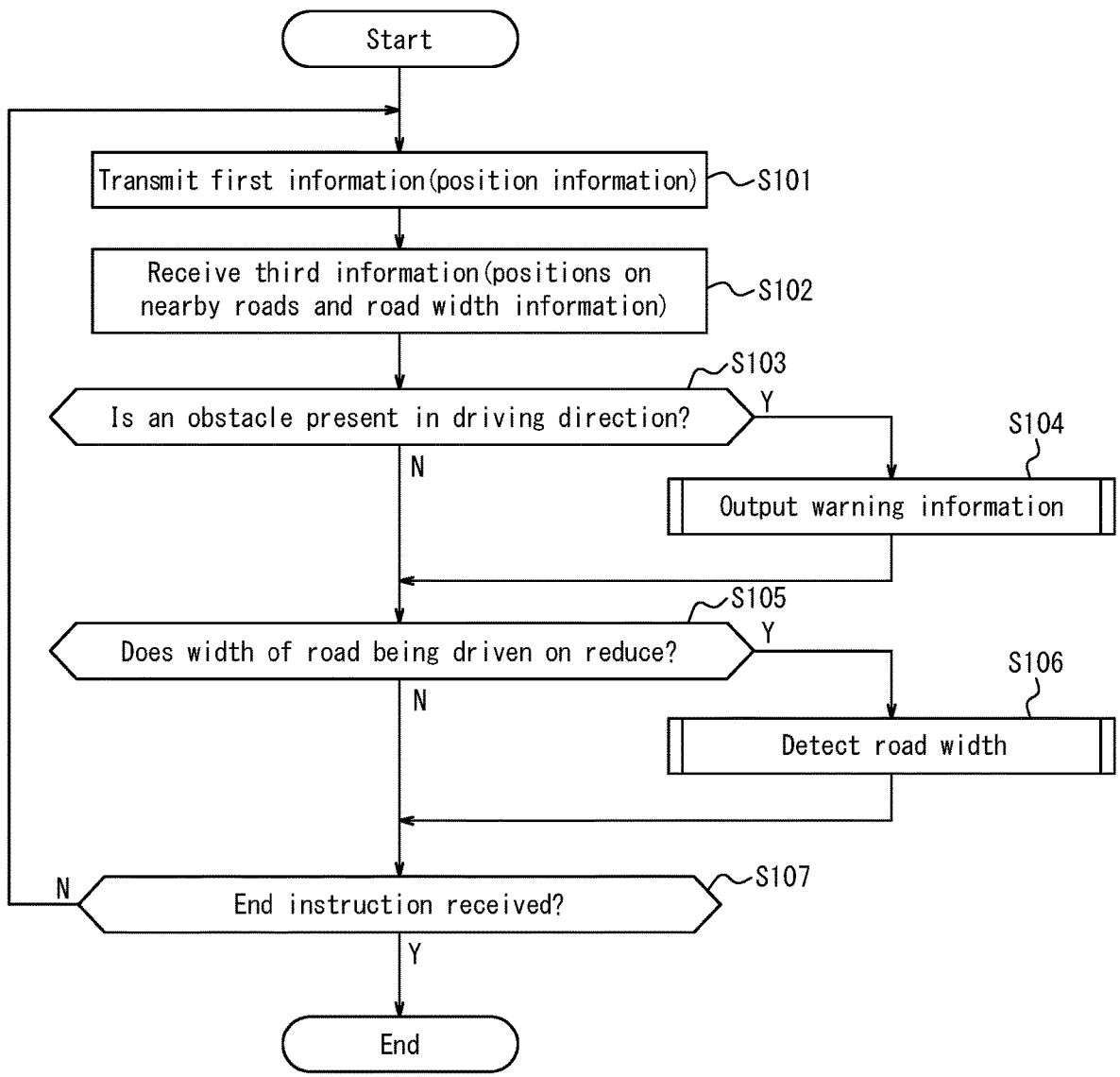
FIG. 5 is a flowchart illustrating an example of processing by the driving assistance apparatus of the first embodiment.

As illustrated in FIG. 5, the driving assistance apparatus 20 transmits first information including the current position information to the information processing apparatus 50 while the camera 10 is deactivated (step S101). In response to transmission of the first information in step S101, the driving assistance apparatus 20 receives third information including positions on nearby roads and road width information from the information processing apparatus 50 (step S102).

Figure 6:
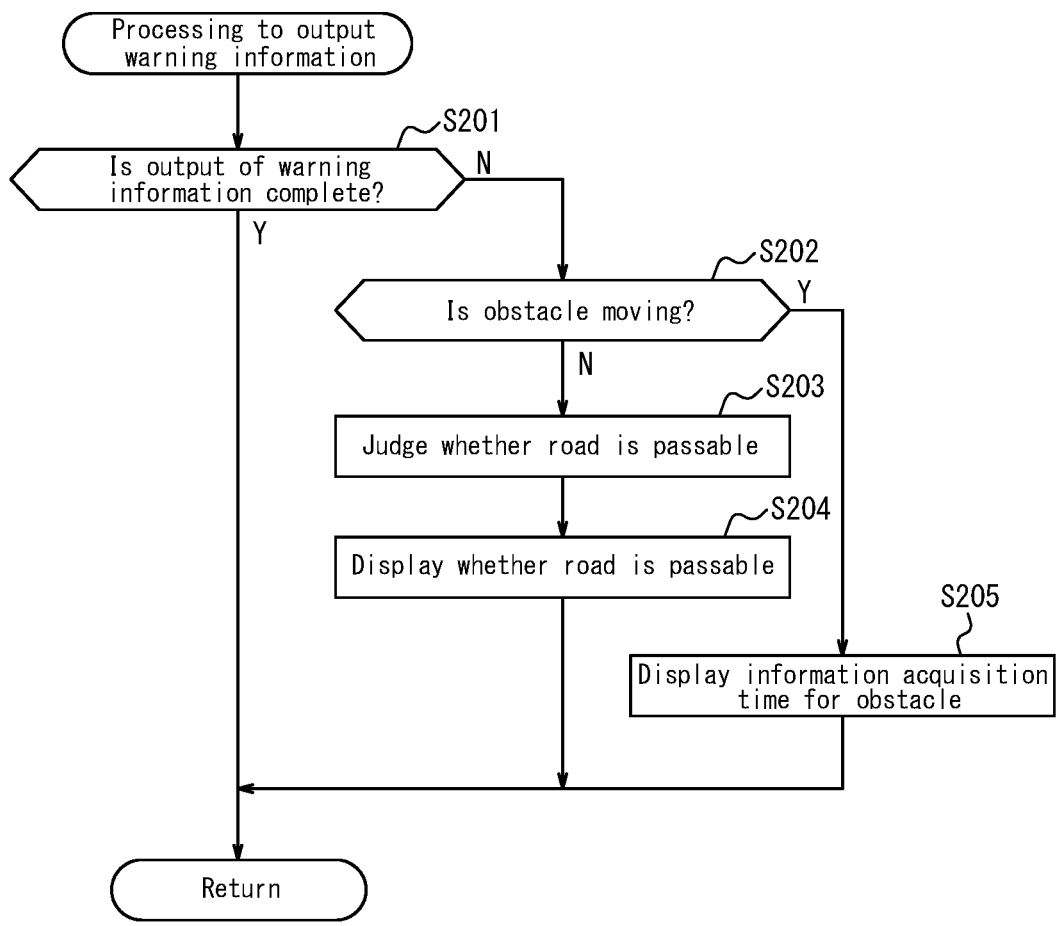
FIG. 6 is a flowchart illustrating an example of processing to output warning information in FIG. 5.

The driving assistance apparatus 20 judges whether an object that could obstruct passage is present in the driving direction of the vehicle 4 based on the received third information (step S103). When an object that could obstruct passage is present (step S103: Y), the driving assistance apparatus 20 executes processing to output warning information (step S104). Details of the processing to output warning information are illustrated in FIG. 6.

In the processing to output warning information, the driving assistance apparatus 20 first judges whether warning information related to the object has already been outputted (step S201). This is to avoid displaying the same warning information multiple times. When warning information regarding the object has not yet been output, the driving assistance apparatus 20 judges whether the object is moving or at rest (step S202). Information on whether the object is moving is included in the third information.

When the object that could obstruct passage is at rest in step S202 (S202: N), the driving assistance apparatus 20 judges whether the road is passable for the vehicle 4 based on the passable road width included in the third information (step S203). The passable road width can be included in the third information as road width information. When the passable road width is narrower than the width of the vehicle 4 stored in the first memory 23, the driving assistance apparatus 20 can judge that the road is not passable. The driving assistance apparatus 20 causes the display apparatus 40 to display whether the road being driven on is passable (step S204).

When the road on which the vehicle 4 is driving branches into a plurality of roads ahead, the driving assistance apparatus 20 acquires the third information for each of the branched roads. The driving assistance apparatus 20 can judge whether each of the branched roads is passable.

When the object that could obstruct passage is moving in step S202 (S202: Y), the driving assistance apparatus 20 causes the display apparatus 40 to display information on the presence of the object, the passable width, and the like along with information acquisition time for the object (step S205). After the display of warning information in step S204 and step S205, the processing to output warning information in FIG. 6 ends.

Figure 7:
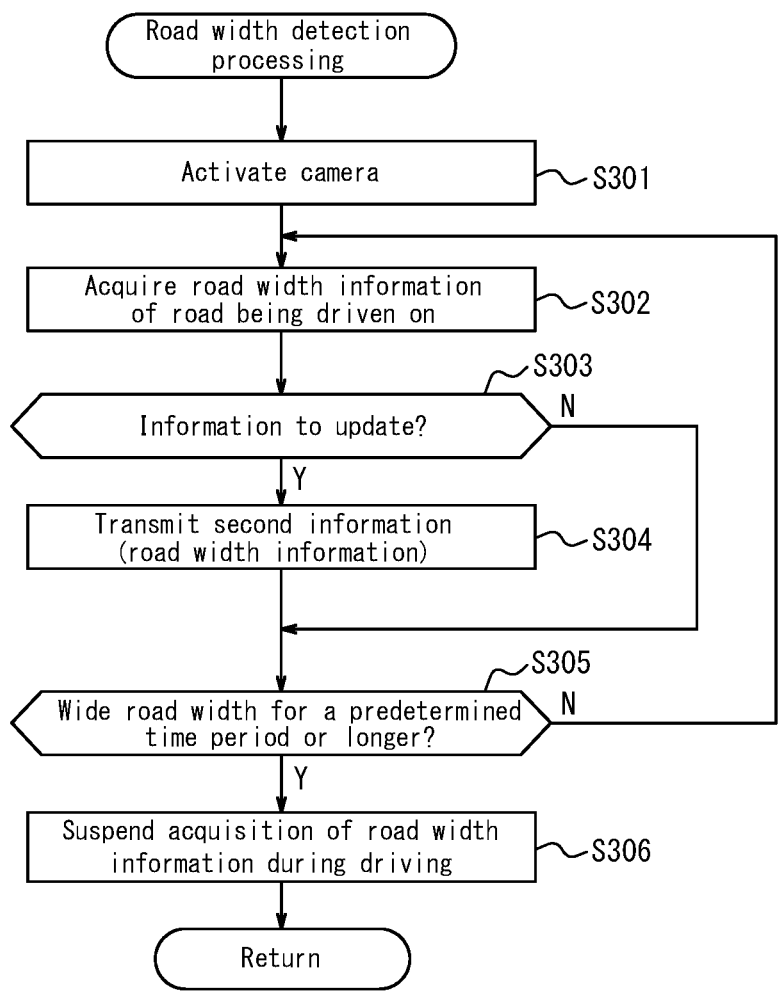
FIG. 7 is a flowchart illustrating an example of road width detection processing in FIG. 5.

Returning to FIG. 5, when no obstacle is present in the driving direction in step S103 (step S103: N), or after the processing to output warning information (step S104), the driving assistance apparatus 20 judges whether the road width of the road being driven on is narrow (step S105). Information on the road width of the road being driven on is included in the third information. When the width of the road being driven on is less than a predetermined value, the driving assistance apparatus 20 starts road width detection processing (step S106). Details of the road width detection processing are illustrated in FIG. 7.

In the road width detection processing, the driving assistance apparatus 20 activates the camera 10 (step S301). The driving assistance apparatus 20 detects road width information of the road being driven on from an image acquired from the camera 10 (step S302).

Subsequently, the driving assistance apparatus 20 compares the road width information with information acquired as third information to judge whether information requires updating (step S303). When information requires updating (step S303: Y), the driving assistance apparatus 20 transmits the position and the road width information to the information processing apparatus 50 as second information (step S304). When no information requires updating (step S303: N), the driving assistance apparatus 20 proceeds directly to step S305.

The driving assistance apparatus 20 repeats the processing from steps S302 to S305 while the road width does not become wider than a predetermined value for a predetermined time period or longer (step S305: N). When the road width is wider than a predetermined value for a predetermined time period or longer, the driving assistance apparatus 20 deactivates the camera 10 and suspends acquisition of road width information during driving (step S306).

Returning to FIG. 5, when the road width of the road being driven on is not narrower than a predetermined value in step S105 (step S105: N), or when the road width detection processing (S106) ends, the driving assistance apparatus 20 proceeds to the following step S107. As long as an end instruction is not received in step S107 (step S107: N), the driving assistance apparatus 20 repeatedly executes the processing in steps S101 to S107. When a predetermined end instruction is received (step S107: Y), the driving assistance apparatus 20 ends processing. The predetermined end processing refers, for example, to when the power to the driving assistance apparatus 20 is cut off or when the vehicle 4 stops driving.

The driving assistance apparatus 20 in FIG. 7 has been described as acquiring only road width information using an image from the camera 10, which is driving path information. In step S302 of FIG. 7, the driving assistance apparatus 20 can also acquire object information. In step S303, the driving assistance apparatus 20 can also judge whether the object information includes information to be updated. When the object information includes information to be updated, the driving assistance apparatus 20 transmits the acquired object information to the information processing apparatus 50.

The driving assistance apparatus 20 may be configured to execute the processing illustrated in FIG. 5 through FIG. 7 by reading a program stored on a non-transitory computer readable medium. Examples of the non-transitory computer readable medium include, but are not limited to, a magnetic storage medium, an optical storage medium, a magneto-optical storage medium, and a semiconductor storage medium. Examples of the magnetic storage medium include a magnetic disk, a hard disk, and magnetic tape. Examples of the optical storage medium include optical discs such as CDs, DVDs, and BDs. Examples of the semiconductor storage medium include read only memory (ROM), electrically erasable programmable read-only memory (EEPROM), and flash memory.

Figure 8:
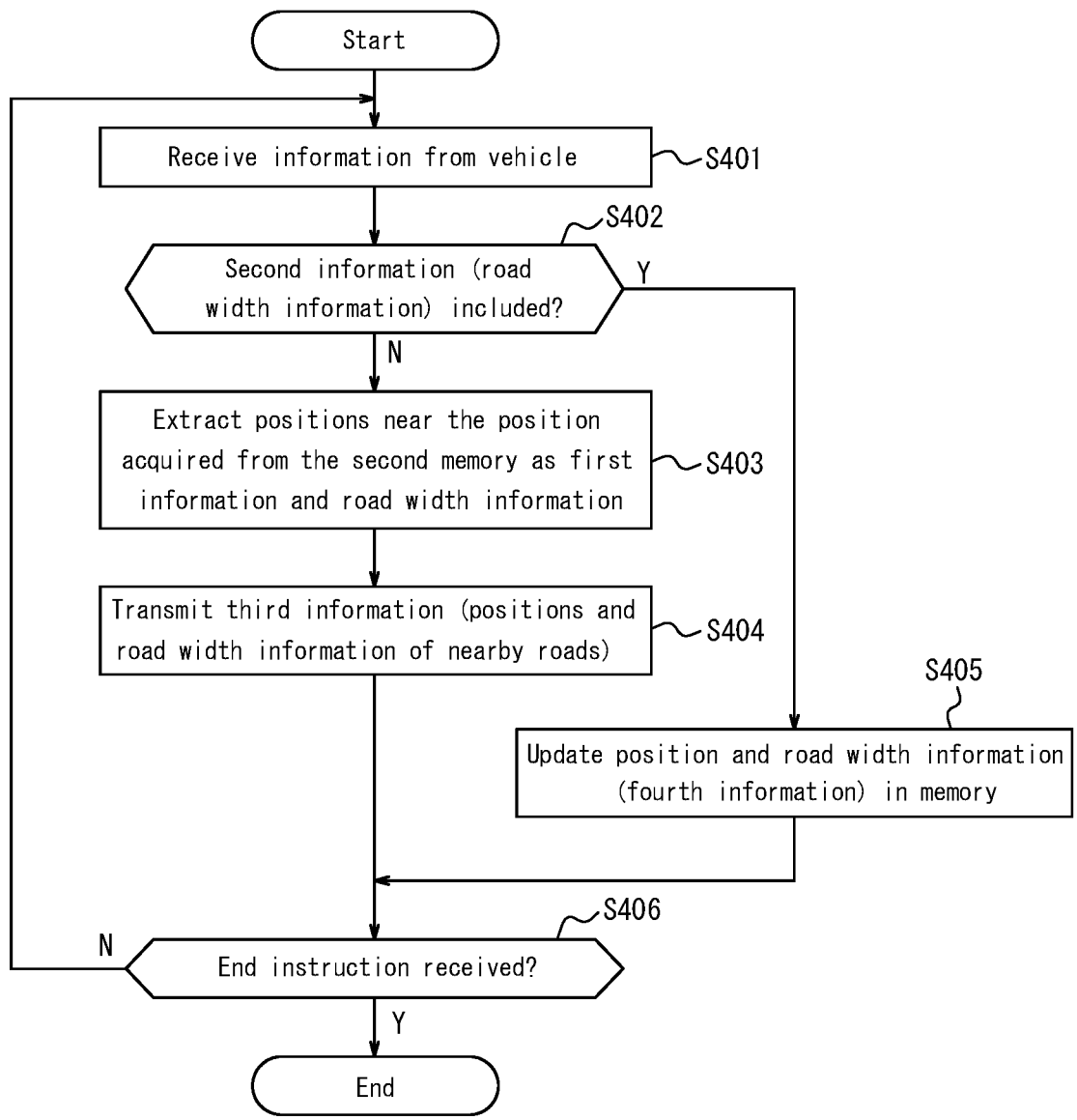
FIG. 8 is a flowchart illustrating an example of processing by an information processing apparatus.

As illustrated in FIG. 8, the information processing apparatus 50 receives information from a plurality of vehicles (step S401). The information processing apparatus 50 judges whether the acquired information includes second information (step S402). When the received information does not include second information (step S402: N), the information processing apparatus 50 receives only first information from the driving assistance apparatus 20 indicating the position. For the position included in the first information, the information processing apparatus 50 extracts third information from the fourth information stored in the second memory 52, including road width information associated with the position and with positions on nearby roads (step S403). The information processing apparatus 50 transmits the third information to the driving assistance apparatus 20 that transmitted the first information (step S404).

When the received information includes second information in step S402 (step S402: Y), the information processing apparatus 50 updates the information on the position and the road width in the fourth information stored in the second memory 52 (step S405). In the second memory 52, the information processing apparatus 50 stores information indicating the position included in the first information in association with the road width information included in the second information. The information processing apparatus 50 can store object information in the second memory 52.

After step S404 or step S405, the information processing apparatus 50 repeats the processing in steps S401 to S406 as long as an end instruction is not received (step 406: N). The information processing apparatus 50 can operate continuously. When an end instruction is received (step S406: Y), the information processing apparatus 50 ends the processing. Examples of the end instruction for the information processing apparatus 50 include suspension of power to the information processing apparatus 50.

In the first embodiment, the information processing apparatus 50 can receive a position and information associated with the position from numerous driving assistance apparatuses 20 mounted in numerous vehicles 4 and aggregate this information. The driving assistance apparatus 20 can acquire nearby road information for the position of the vehicle 4 and nearby positions from the information processing apparatus 50 and can judge whether the road on which the vehicle 4 is about to drive is passable. Consequently, the driving assistance system 1 of the present disclosure contributes to smooth road traffic. Furthermore, the imaging system 2 of the first embodiment does not need to operate the camera 10 and perform image recognition processing continuously. The camera 10 and the computer resources of the driving assistance apparatus 20 can thus be used effectively. The driving assistance apparatus 20 can judge with high certainty whether the road that the vehicle 4 is about to enter is passable. Furthermore, the driving assistance apparatus 20 can judge whether the road being driven on is passable ahead, before reaching a point that is not easily passable.

Second Embodiment

A second embodiment of the present disclosure is now described with reference to the drawings.

Figure 9:
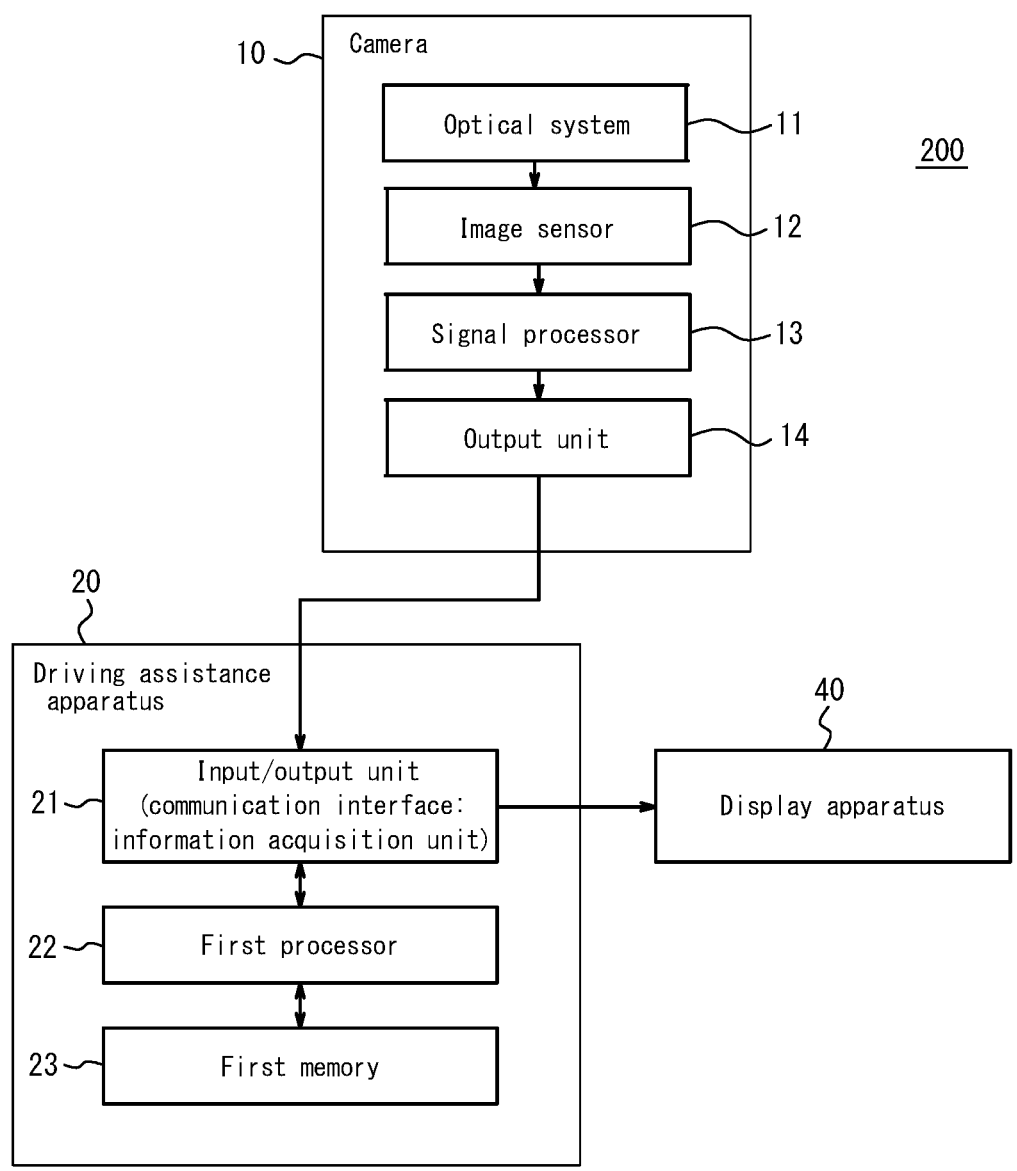
FIG. 9 is a block diagram illustrating the schematic configuration of a driving assistance system of a second embodiment.

As illustrated in FIG. 9, a driving assistance system 200 according to the second embodiment includes a camera 10, a driving assistance apparatus 20, a display apparatus 40, and so forth, like the driving assistance system 1 according to the first embodiment. Unlike the driving assistance system 1 according to the first embodiment, the driving assistance system 200 according to the second embodiment need not include the position sensor 30 and the information processing apparatus 50. As in the first embodiment, the camera 10, the driving assistance apparatus 20, the position sensor 30, and the display apparatus 40 can be mounted in a vehicle 4, as illustrated in FIG. 2. The camera 10, the driving assistance apparatus 20, the position sensor 30, and the display apparatus 40, along with below-described constituent elements thereof, are similar in terms of hardware to the constituent elements of the first embodiment, and the same reference signs as in the first embodiment are used. As described below, however, these constituent elements differ from the first embodiment in the content of acquired or stored information, the content of information processing that is executed, and the content and output method of information that is outputted.

The driving assistance apparatus 20 includes an input/output unit 21 (information acquisition unit), a first processor 22 (processor), a first memory 23, and the like.

The first processor 22 can acquire driving history for the road on which the vehicle 4 is driving. The driving history includes positions along the road on which the vehicle 4 has driven and driving path information of each position. The driving path information is information related to a road. The driving path information can, for example, include a road width W1, an object width W2, a passable width W3, a steering angle, an image captured by the camera 10, and the like. The road width W1 is the width of the road. The object width W2 is the width of an object on the road, such as another vehicle, an obstacle, or a telephone pole. The passable width W3 is the width of the road that is passable. The steering angle is the angle of the steering wheel.

Specifically, the first processor 22 can acquire the road width W1 based on the number of pixels in the horizontal direction among pixels representing the road in an image captured by the camera 10 and inputted by the input/output unit 21. The first processor 22 can acquire the road width W1 using sonar sensors provided on the sides of the vehicle 4. The first processor 22 is not restricted to these methods and can acquire the road width W1 with any method.

The first processor 22 can acquire the object width W2 by detecting an object based on the parallax of two images captured by two cameras 10. The first processor 22 is not restricted to this method and can acquire the object width W2 with any method.

The first processor 22 can calculate the passable width W3 based on the acquired road width W1 and object width W2. For example, the first processor 22 can calculate the passable width W3 by subtracting the object width W2 from the road width W1, i.e. as W1-W2. The first processor 22 can also calculate the passable width W3 by subtracting the object width W2 and a margin W4 from the road width W1, i.e. W1-(W2+W4).

The first processor 22 can determine whether the road width W1 acquired as described above is less than a predetermined threshold W1th. When it is determined that the road width W1 is less than the predetermined threshold W1th, the first processor 22 determines that the vehicle 4 has started to drive on a narrow road. As described above, the first processor 22 can then acquire the road width W1, the object width W2, and the passable width W3 and store these in the first memory 23 at predetermined intervals (such as 2 m intervals) for the road on which the vehicle 4 is driving. When the first processor 22 determines that the vehicle 4 has started to drive on a narrow road, the first processor 22 starts to store images acquired by the camera 10 in the first memory 23 in association with the position P at which each image was captured.

In the following example, the vehicle 4 is driving on a road such as the one illustrated in FIG. 10. First, it is assumed that the vehicle 4 is driving to the left, on paper, on the road at the bottom of FIG. 10 (see (1) of FIG. 10). In this case, the first processor 22 acquires the road width W1 at position A as 10.0 m. Furthermore, the first processor 22 determines whether the road width W1 is less than the predetermined threshold W1th of 5.0 m. At position A, the road width W1 is equal to or greater than the threshold W1th. In this case, the first processor 22 continues to acquire the road width W1 during driving.

Figure 10:
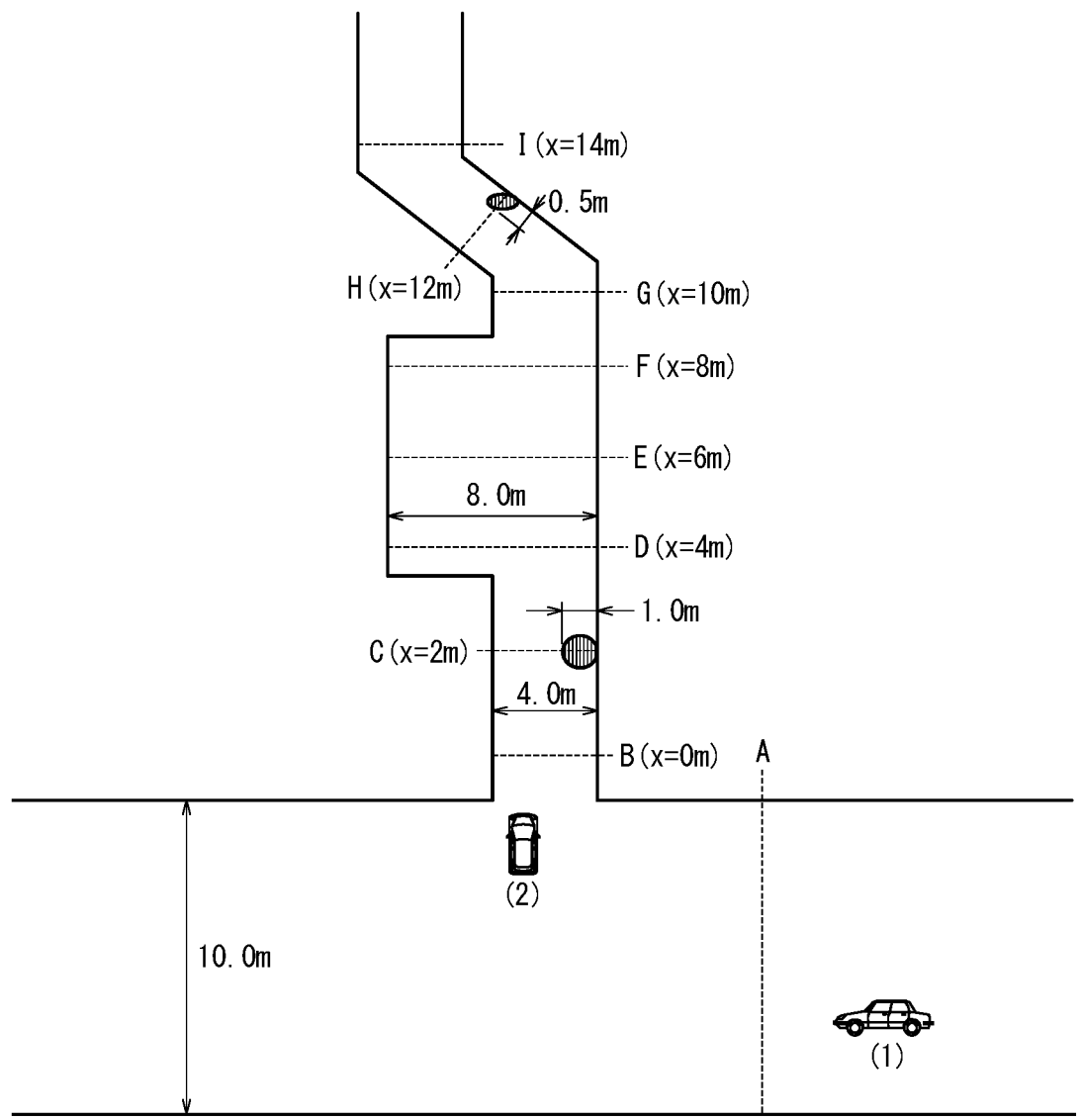
FIG. 10 is a schematic diagram illustrating a road on which a vehicle drives.

After the vehicle 4 passes position A and turns right (see (2) of FIG. 10), the first processor 22 acquires the road width W1 of 4.0 m at position B where the vehicle 4 is driving. The first processor 22 then determines whether the road width W1 of 4.0 m is less than the predetermined threshold W1th of 5.0 m. At position B, the road width W1 is less than the threshold W1th. In this case, the first processor 22 subsequently acquires the road width W1, the object width W2, and the passable width W3 at predetermined intervals, as described above. The first processor 22 also starts to store the images captured by the camera 10 in the first memory 23.

As illustrated in FIG. 11, the first processor 22 can store the road width W1, the object width W2, and the passable width W3 at the position P of the vehicle 4 in the first memory 23 in association with the position P. The position of the vehicle 4 is, for example, represented as a driving distance x from the position where the road width W1 was determined to be less than the predetermined threshold. The method of representing the position of the vehicle 4 is not limited to this case. For example, the vehicle 4 may include a GPS receiver, and the position of the vehicle 4 may be represented as coordinates for identifying the position specified by the GPS receiver.

When it is determined that the road width W1 is less than the predetermined threshold W1th, the first processor 22 starts to record images captured by the camera 10 at positions P in the first memory 23 as driving path information in association with the positions P.

The steering angle of the steering wheel of the vehicle 4 is measured by a steering angle sensor or the like and inputted to an ECU for controlling the vehicle 4. The first processor 22 can acquire the steering angle from the ECU. The first processor 22 can then store the steering angle along with the road width W1, the object width W2, and the passable width W3 in the first memory 23 in association with the position P of the vehicle 4.

When it is determined that the vehicle 4 has stopped driving on a narrow road, the first processor 22 ends the processing to store the driving path information, i.e. the road width W1, the object width W2, the passable width W3, the steering angle, the image, and the like, in the first memory 23. The first processor 22 can infer that the vehicle 4 has started to drive on a wide road when, for example, a road width W1 equal to or greater than the predetermined threshold W1th is acquired consecutively a predetermined number of times (N times) or more. The first processor 22 can thus determine that the vehicle 4 has stopped driving on a narrow road.

The end of processing to store driving path information is now described with reference again to the example in FIG. 10. The first processor 22 acquires 8.0 m as the road width W1 and 0 m as the object width W2 at position D where the vehicle 4 is driving. The first processor 22 acquires 8.0 m as the passable width W3, since the road width W1 is 8.0 m and the object width W2 is 0 m. The first processor 22 then determines that the road width W1 of 8.0 m is equal to or greater than the predetermined threshold W1th of 5.0 m. Subsequently, when it is consecutively determined that the road width W1 is equal to or greater than the threshold W1th a predetermined number of times or greater, the first processor 22 ends the processing to acquire the object width W2 and the passable width W3 and the processing to store images. If N>3, however, then the first processor 22 acquires 8.0 m as the road width W1 at subsequent positions E, F and acquires 4.0 m, which is shorter than the threshold W1th, as the road width W1 at the next position G in this example. The first processor 22 therefore continues the processing to store the driving path information.

When the vehicle 4 starts to drive on a narrow road, the first processor 22 can detect an oncoming vehicle 104 ahead of the vehicle 4. Specifically, the first processor 22 can detect the oncoming vehicle 104 based on an image captured by the camera 10 and inputted by the input/output unit 21. The first processor 22 can use pattern matching or the like to detect a vehicle 4 captured in an image. The first processor 22 can detect an oncoming vehicle 104 based on two images that are captured by two cameras 10 and have parallax. The first processor 22 is not restricted to these methods and can detect the oncoming vehicle 104 with any method.

When no oncoming vehicle 104 is detected, the first processor 22 continues to acquire the road width W1, the object width W2, and the passable width W3 and to store these in the first memory 23.

When the oncoming vehicle 104 is detected, the first processor 22 can determine whether the vehicle 4 and the oncoming vehicle 104 can pass each other. Specifically, the first processor 22 can calculate a width W5 of the oncoming vehicle 104 based on an image captured by the camera 10. The first processor 22 can determine whether the vehicle 4 and the oncoming vehicle 104 can pass each other based on the passable width W3, the width W5 of the oncoming vehicle 104, and a width W6 of the vehicle 4. For example, the first processor 22 determines whether a passing width, which is the sum of the width W5 of the oncoming vehicle 104 and the width W6 of the vehicle 4, is less than the passable width W3. When the sum is less than the passable width W3, the first processor 22 determines that the vehicle 4 and the oncoming vehicle 104 can pass each other. When the sum is equal to or greater than the passable width W3, the first processor 22 determines that the vehicle 4 and the oncoming vehicle 104 cannot pass each other.

When it is determined that the vehicle 4 and the oncoming vehicle 104 cannot pass each other, the first processor 22 can extract a passable width W3 that is equal to or greater than the passing width from the driving history stored in the first memory 23.

When a passable width W3 that is equal to or greater than the passing width is extracted, the first processor 22 can determine whether positions P equal to or greater than the passing width are continuous along a length equal to or greater than the total length of the vehicle 4. When positions equal to or greater than the passing width are continuous along a length equal to or greater than the total length of the vehicle 4, the first processor 22 can extract a region including the continuous positions as a passable region. This passable region corresponds to a region in actual space such as an intersection, a T junction, or a retreat space.

The first processor 22 can output a first passable position Pp1 included in the passable region to the display apparatus 40 through the input/output unit 21 and cause the display apparatus 40 to display the first passable position Pp1. While the vehicle 4 backs up from the current position to the first passable position Pp1, the vehicle 4 passes through each position P stored in the first memory 23. At this time, the first processor 22 can extract the steering angle stored in association with each position P. The first processor 22 can output the extracted steering angle to the display apparatus 40 through the input/output unit 21. In this case, the display apparatus 40 displays the outputted steering angle. The first processor 22 can output the steering angle to the ECU of the vehicle 4 through the input/output unit 21. When the vehicle 4 backs up and reaches each position P, for example, this configuration allows the ECU to assist with driving based on the steering angle at each position outputted by the input/output unit 21.

As illustrated in FIG. 11, the first memory 23 can store the position P of the vehicle 4 and the driving path information of the position P in association as the driving history. The road width W1, the object width W2, and the passable width W3 at a position P are included in the driving path information, as described above. While not illustrated in FIG. 11, the first memory 23 can store an image captured at a position P as the driving path information. The steering angle of the steering wheel of the vehicle 4 at a position P may be included in the driving path information. In the example illustrated in FIG. 11, the first memory 23 stores 4.0 m as the road width W1, 1.0 m as the object width W2, 3.0 m as the passable width W3, and 0° as the steering angle at a position where the vehicle 4 has driven 2 m from a reference position.

The display apparatus 40 can display first position information, outputted by the driving assistance apparatus 20, on a display panel 33. The first position information includes the current position of the vehicle 4, the first passable position Pp1, a driving distance L1 from the current position to the first passable position Pp1, and the like. A display processor 32 can display the steering angle at each position P until the first passable position Pp1 on the display panel 33.

The remaining structure and effects of the second embodiment are similar to those of the first embodiment. Hence, the same or corresponding constituent elements are labeled with the same reference signs, and a description thereof is omitted.

Next, a driving assistance method of the driving assistance system 200 of the second embodiment is described with reference to FIG. 12.

First, while the vehicle 4 is driving, the first processor 22 of the driving assistance apparatus 20 acquires the road width W1 of the road on which the vehicle 4 is driving based on an image captured by the camera 10 (step S501).

When the road width W1 is acquired, the first processor 22 determines whether the road width W1 is less than the predetermined threshold W1th (step S502).

When it is determined that the road width W1 is less than the predetermined threshold W1th (step S502: Y), the first memory 23 starts to store images captured by the camera 10 in association with the position P where each image was captured (step S503). When it is determined that the road width W1 is equal to or greater than the predetermined threshold W1th (step S502: N), the first processor 22 returns to step S501 and acquires the road width W1 again.

When it is determined that the road width W1 is less than the predetermined threshold W1th, the first processor 22 starts to acquire the road width W1, the object width W2, and the passable width W3 at predetermined intervals for the road on which the vehicle 4 is driving and to store these values in the first memory 23 (step S504).

When the road width W1, the object width W2, and the passable width W3 start to be stored in step S504, the first processor 22 performs processing to detect an oncoming vehicle 104 and determines whether an oncoming vehicle 104 is detected (step S505).

When an oncoming vehicle 104 is not detected in step S505 (step S505: N), the first processor 22 repeats the processing in step S504 and step S505. When an oncoming vehicle 104 is detected in step S505 (step S505: Y), the first processor 22 determines whether the vehicle 4 and the oncoming vehicle 104 can pass each other (step S506).

When it is determined that the vehicle 4 and the oncoming vehicle 104 can pass each other (step S506: Y), the first processor 22 returns to step S504 and repeats the processing. At this time, the first processor 22 may output an indication that passing is possible to the display apparatus 40. The display apparatus 40 may display the indication that passing is possible. After referring to this display of the display apparatus 40, the driver of the vehicle 4 drives so as to pass the oncoming vehicle 104 and continue ahead.

When it is determined in step S506 that the vehicle 4 and the oncoming vehicle 104 cannot pass each other (step S506: N), the first processor 22 extracts a passable width W3 that is equal to or greater than the passing width from the driving history stored in the first memory 23. The first processor 22 extracts the positions P stored in association with the passable width W3. Furthermore, when the positions P are continuous along a length equal to or greater than the total length of the vehicle 4, the first processor 22 extracts the first passable position Pp1 included in the passable region that includes the continuous positions P. The first processor 22 then causes the display apparatus 40 to display the first passable position Pp1 (step S507).

Here, the first processor 22 can output images, to the display apparatus 40, that were captured while the vehicle 4 drove forward from the first passable position Pp1 to the current position and were stored in the first memory 23. The first processor 22 can then cause the display apparatus 40 to display these images. When each position P is reached after the vehicle 4 starts backing up, the first processor 22 can read the steering angle stored in the first memory 23 in association with each position P, output the steering angle to the display apparatus 40, and cause the display apparatus 40 to display the steering angle.

Figure 12:
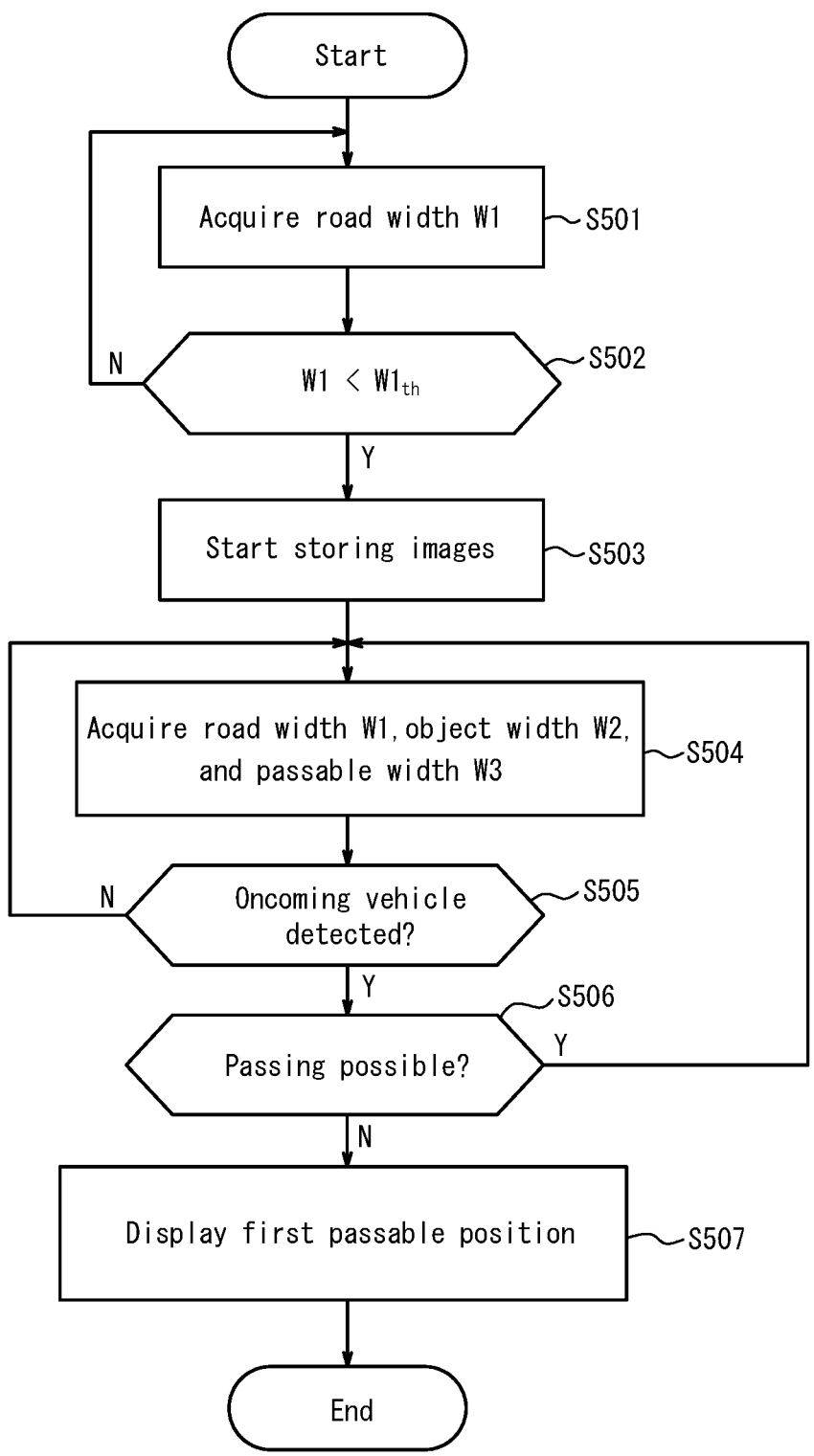
FIG. 12 is a flowchart illustrating an example of processing by the driving assistance apparatus of the second embodiment.

The driving assistance apparatus 20 may be configured to execute the processing illustrated in FIG. 12 by reading a program stored on a non-transitory computer readable medium.

When the vehicle 4 is driving in the second embodiment, the first memory 23 stores the position of the vehicle 4 and the driving path information of the position in association as driving history, and the first processor 22 can detect an oncoming vehicle 104, as described above. The first processor 22 can extract the first passable position Pp1 based on the driving history in the first memory 23 when the oncoming vehicle 104 is detected. Hence, when the oncoming vehicle 104 is encountered on a narrow road and the vehicle 4 backs up, the driving assistance apparatus 20 can display the first passable position Pp1 to the driver based on the conditions of the road on which the vehicle 4 has actually driven. This allows the driver to identify, at an early stage, the position at which the vehicle 4 and the oncoming vehicle 104 can definitely pass each other and to maneuver the vehicle 4 in reverse at ease.

The second embodiment allows the driving assistance apparatus 20 to extract the first passable position Pp1 based on the width of the oncoming vehicle 104 and the width and length of the vehicle 4. Consequently, the driver can identify the position at which the oncoming vehicle 104 and the vehicle 4 can definitely pass each other. For example, this avoids a situation in which the width or length of the vehicle 4 does not fit into a retreat area, preventing passing and forcing the driving assistance apparatus 20 to search again for a passable position. The driver can therefore efficiently move the vehicle 4 to the first passable position Pp1.

The driving assistance apparatus 20 of the second embodiment can store images captured when the vehicle 4 is driving on a narrow road. When the vehicle 4 detects an oncoming vehicle 104 and then backs up, the driving assistance apparatus 20 can display an image representing the nearby conditions from the current position to the first passable position Pp1. This allows the driver to drive more safely by backing up after grasping the nearby conditions.

The driving assistance apparatus 20 of the second embodiment can display steering angle information representing the steering angle at each position of the vehicle 4 while the vehicle 4 is driving. When the vehicle 4 detects the oncoming vehicle 104 and backs up to the first passable position Pp1, the driver can therefore learn where and how much to turn the steering wheel. This allows the driver to drive more safely.

The first processor 22 of the second embodiment ends processing to store the road width W1, the object width W2, the passable width W3, the steering angle, the image, and the like in the first memory 23 when a road width W1 equal to or greater than the predetermined threshold W1th is acquired consecutively a predetermined number of times or greater. It can be inferred in this case that the vehicle 4 has stopped driving on a narrow road. In other words, it can be inferred that the vehicle 4 is driving on a wide road. Hence, the driving assistance apparatus 20 does not store information for driving assistance while passing an oncoming vehicle 104. The storage space of the first memory 23 can therefore be saved.

Third Embodiment

Next, a third embodiment of the present disclosure is described with reference to the drawings.

Figure 13:
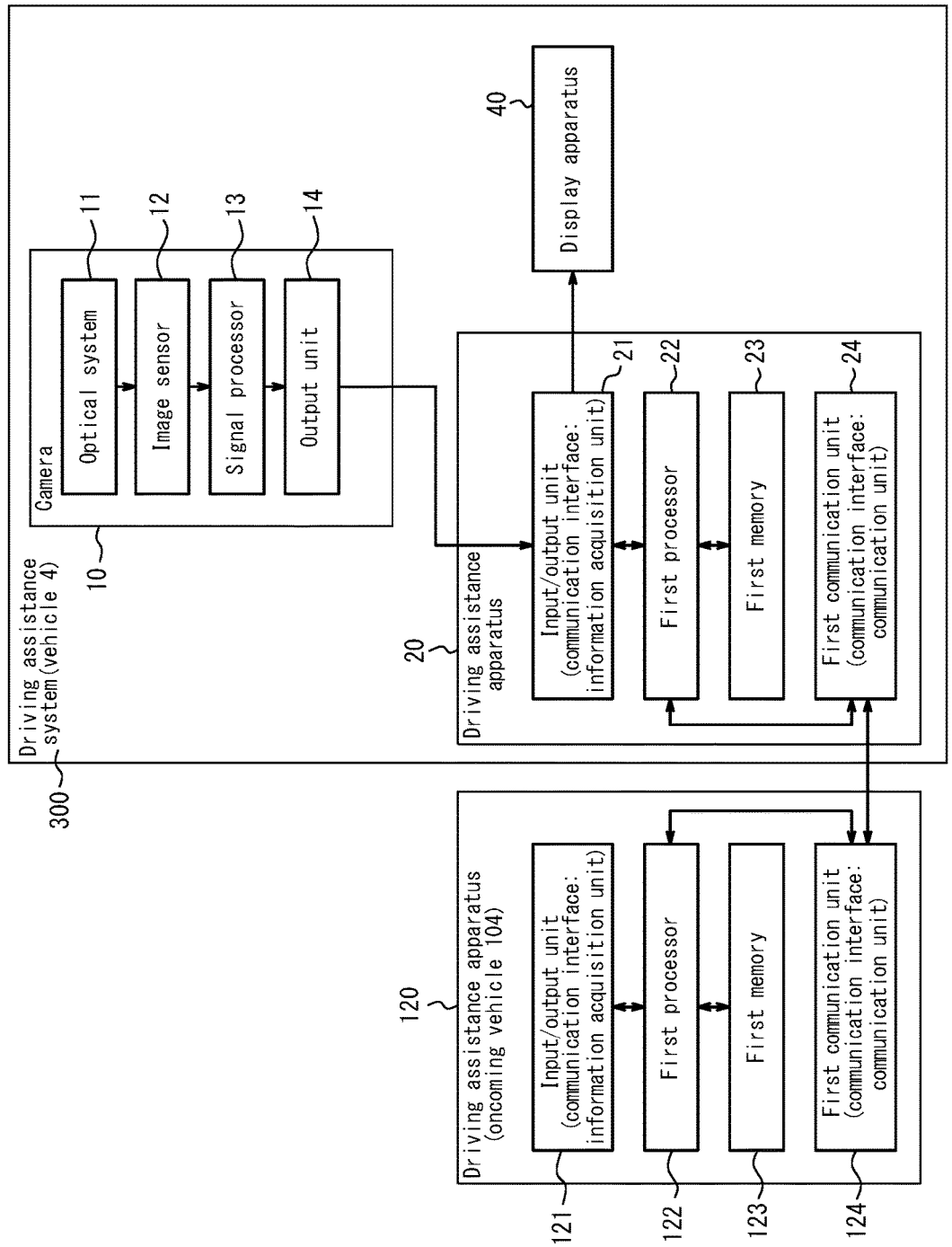
FIG. 13 is a block diagram illustrating the schematic configuration of a driving assistance system of a third embodiment.

As illustrated in FIG. 13, a driving assistance system 300 according to the third embodiment includes a camera 10, a driving assistance apparatus 20, a display apparatus 40, and so forth, like the driving assistance system 200 according to the second embodiment.

The driving assistance apparatus 20 of the third embodiment includes an input/output unit 21 (information acquisition unit), a first processor 22, a first memory 23, and so forth, like the driving assistance apparatus 20 of the second embodiment. The driving assistance apparatus 20 of the third embodiment includes a first communication unit 24 (communication unit), unlike the driving assistance apparatus 20 of the second embodiment.

Over a vehicle-to-vehicle communication network, the first communication unit 24 can transmit and receive information to and from a first communication unit 124 of a driving assistance apparatus 120 provided in an oncoming vehicle 104.

Specifically, the first communication unit 24 can receive passing information from the first communication unit 124 of the oncoming vehicle 104. The passing information includes the current position of the oncoming vehicle 104 and a second passable position Pp2, which is extracted by a first processor 122 of the oncoming vehicle 104 and indicates a passable position in the case of the oncoming vehicle 104 backing up. The first communication unit 24 can transmit passing information that includes a first passable position Pp1, which is a passable position in the case of the vehicle 4 backing up, to the first communication unit 124 of the oncoming vehicle 104.

The first processor 22 of the third embodiment includes similar functions as the first processor 22 of the second embodiment.

Furthermore, when the first processor 22 of the third embodiment detects the oncoming vehicle 104 and determines that passing is not possible, the first processor 22 can determine the course of action of the vehicle 4, i.e. whether to proceed or back up. In other words, the first processor 22 of the third embodiment can determine whether the vehicle 4 and the oncoming vehicle 104 are to pass each other at the first passable position Pp1 or the second passable position Pp2.

Specifically, the first processor 22 compares a driving distance L1 and a driving distance L2. The driving distance L1 is the distance from the current position of the vehicle 4 to the first passable position Pp1. The driving distance L2 is the distance from the current position of the oncoming vehicle 104 to the second passable position Pp2. The first processor 22 determines whether the driving distance L1 is equal to or greater than the driving distance L2. When the driving distance L1 is determined to be equal to or greater than the driving distance L2, the first processor 22 outputs information to the display apparatus 40 indicating that the vehicle 4 should proceed and the oncoming vehicle 104 should back up. When the driving distance L1 is determined to be less than the driving distance L2, the first processor 22 outputs information to the display apparatus 40 indicating that the vehicle 4 should back up and the oncoming vehicle 104 should proceed.

The remaining structure and effects of the third embodiment are similar to those of the second embodiment. Hence, the same or corresponding constituent elements are labeled with the same reference signs, and a description thereof is omitted.

Next, a driving assistance method of the driving assistance system 300 of the third embodiment is described with reference to FIG. 14.

First, while the vehicle 4 is driving, the first processor 22 of the driving assistance apparatus 20 acquires a road width W1 of the road on which the vehicle 4 is driving based on an image captured by the camera 10 (step S601).

When the road width W1 is acquired in step S601, the first processor 22 determines whether the road width W1 is less than a predetermined threshold W1 th (step S602).

When it is determined in step S602 that the road width W1 is less than the predetermined threshold W1th (step S602: Y), the first memory 23 starts to store the images captured by the camera 10 in association with the position P where each image was captured (step S603). When it is determined in step S602 that the road width W1 is equal to or greater than the predetermined threshold W1th (step S602: N), the first processor 22 returns to step S601 and acquires the road width W1 again.

When it is determined in step S602 that the road width W1 is less than the predetermined threshold W1th (step S602: N), the first processor 22 acquires the road width W1, an object width W2, and a passable width W3 at predetermined intervals (such as 2 m intervals) for the road on which the vehicle 4 is driving. The first processor 22 stores the acquired road width W1, object width W2, and passable width W3 in the first memory 23 (step S604).

When the road width W1, the object width W2, and the passable width W3 are acquired in step S604, the first processor 22 performs processing to detect an oncoming vehicle 104 and determines whether an oncoming vehicle 104 is detected (step S605).

When an oncoming vehicle 104 is not detected in step S605 (step S605: N), the first processor 22 repeats the processing in step S604 and step S605. When an oncoming vehicle 104 is detected in step S605 (step S605: Y), the first processor 22 determines whether the vehicle 4 and the oncoming vehicle 104 can pass each other (step S606).

When it is determined that the vehicle 4 and the oncoming vehicle 104 can pass each other (step S606: Y), the first processor 22 returns to step S604 and repeats the processing. At this time, the input/output unit 21 may output an indication that passing is possible to the display apparatus 40, and the display apparatus 40 may display this indication. When it is determined in step S606 that the vehicle 4 and the oncoming vehicle 104 cannot pass each other (step S606: N), the first processor 22 extracts the first passable position Pp1 for the case of the vehicle 4 backing up from the driving history stored in the first memory 23. The first processor 22 then calculates the driving distance L1 from the current position to the first passable position Pp1 (step S607).

When it is determined in step S606 that the vehicle 4 and the oncoming vehicle 104 cannot pass each other, the first communication unit 24 issues a request, to the driving assistance apparatus 120 of the oncoming vehicle 104, for passing information that includes the current position of the oncoming vehicle 104 and the second passable position Pp2. The first communication unit 24 then receives the passing information transmitted by the oncoming vehicle 104 in response to the request (step S608). In response to a request from the driving assistance apparatus 120, the first communication unit 24 transmits passing information that includes the current position of the vehicle 4 and the first passable position Pp1 extracted in step S606 (step S608).

When the passing information is received from the oncoming vehicle 104 in step S608, the first processor 22 determines whether the driving distance L1 is longer than the driving distance L2 (step S609).

When the driving distance L1 is determined to be longer than the driving distance L2 in step S609 (step S609: Y), the first processor 22 outputs information indicating that the vehicle 4 is to proceed to the display apparatus 40 through the input/output unit 21. The display apparatus 40 then displays the information (step S610). When the information is displayed by the display apparatus 40 in step S610, the processing returns to step S604 and is repeated.

Conversely, when the driving distance L1 is determined to be equal to or less than the driving distance L2 in step S609 (step S609: N), the first processor 22 determines whether the driving distance L1 is less than the driving distance L2 (step S611).

When the driving distance L1 is determined to be less than the driving distance L2 in step S611 (step S611: Y), the first processor 22 outputs information indicating that the vehicle 4 is to back up to the display apparatus 40 through the input/output unit 21. The display apparatus 40 then displays the information (step S612).

When the information is displayed by the display apparatus 40 in step S612, the first processor 22 outputs the first passable position Pp1 to the display apparatus 40 through the input/output unit 21. The display apparatus 40 then displays the first passable position Pp1 (step S613).

When the driving distance L1 is not less than the driving distance L2 in step S611 (step S611: N), i.e. when the driving distance L1 and the driving distance L2 are determined to be equal, the first communication unit 24 receives a passable width W32 at the second passable position Pp2 from the oncoming vehicle 104. The first processor 22 then determines whether a passable width W31 at the first passable position Pp1 is longer than the passable width W32 (step S614).

When the passable width W31 is determined to be longer than the passable width W32 in step S614 (step S614: Y), the first processor 22 outputs information indicating that the vehicle 4 is to back up to the display apparatus 40 through the input/output unit 21. The display apparatus 40 then displays the information (step S612).

When the passable width W31 is determined to be less than the passable width W32 in step S614 (step S614: N), the first processor 22 outputs information indicating that the vehicle 4 is to proceed to the display apparatus 40 through the input/output unit 21, and the display apparatus 40 displays the information (step S610).

When the passable width W31 and the passable width W32 are determined to be equal in step S614, the first processor 22 may determine the course of action of the vehicle 4 in accordance with whether a first statistical value is longer than a second statistical value. The first statistical value is a statistical value (mean, median, or the like) of the passable width W3 at each position P along the driving path from the current position of the vehicle 4 to the first passable position Pp1. The second statistical value is a statistical value of the passable width W3 at each position P along the driving path from the current position of the oncoming vehicle 104 to the second passable position Pp2.

When the first statistical value and the second statistical value are determined to be equal, the first processor 22 may determine the course of action of the vehicle 4 based on the passable width W31 at the passable position Pp1 and the passable width W32 at the passable position Pp2.

The first processor 22 may instead determine the course of action by any method other than the above methods.

By the input/output unit 21 transmitting the passing information of the vehicle 4 to the driving assistance apparatus 120 in step S608, the first processor 22 and the driving assistance apparatus 120 of the oncoming vehicle 104 can determine the course of action based on the driving distance L1 and the driving distance L2.

Figure 14:
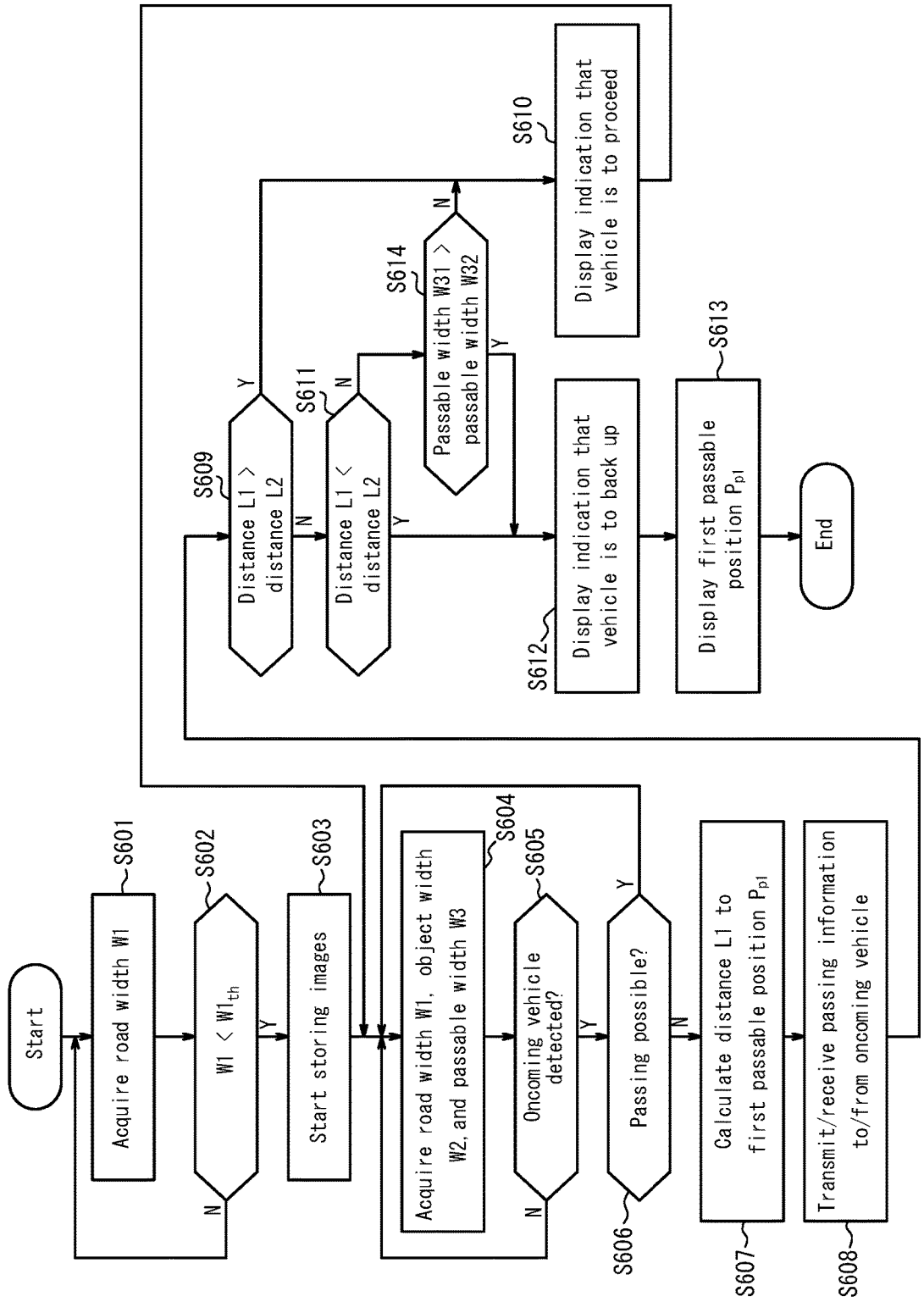
FIG. 14 is a flowchart illustrating an example of processing by the driving assistance system of the third embodiment.

The driving assistance apparatus 20 may be configured to execute the processing illustrated in FIG. 14 by reading a program stored on a non-transitory computer readable medium.

As described above, when an oncoming vehicle 104 is detected on a narrow road and the vehicle 4 backs up, the driving assistance apparatus 20 of the third embodiment can extract the first passable position Pp1 based on conditions of the road on which the vehicle 4 has actually driven. This achieves similar effects to those of the second embodiment, i.e. allowing the driver to identify, at an early stage, the position at which the vehicle 4 and the oncoming vehicle 104 can definitely pass each other and to maneuver the vehicle 4 in reverse at ease.

When the vehicle 4 detects the oncoming vehicle 104, the driving assistance apparatus 20 of the third embodiment can determine whether the vehicle 4 should back up and the oncoming vehicle 104 proceed, or whether the vehicle 4 should proceed and the oncoming vehicle 104 back up, based on the driving distances L1, L2. To make this determination, the driving assistance apparatus 20 can determine which is smaller: the driving distance L1 that the vehicle 4 would traverse by backing up, or the driving distance L2 that the oncoming vehicle 104 would traverse by backing up. The driving assistance apparatus 20 can thereby cause the display apparatus 40 to display the method of movement requiring less backing up. Therefore, the vehicle 4 and the oncoming vehicle 104 can move to the first passable position Pp1 or the second passable position Pp2 and pass each other smoothly.

Fourth Embodiment

Next, a fourth embodiment of the present disclosure is described with reference to the drawings.

Figure 15:
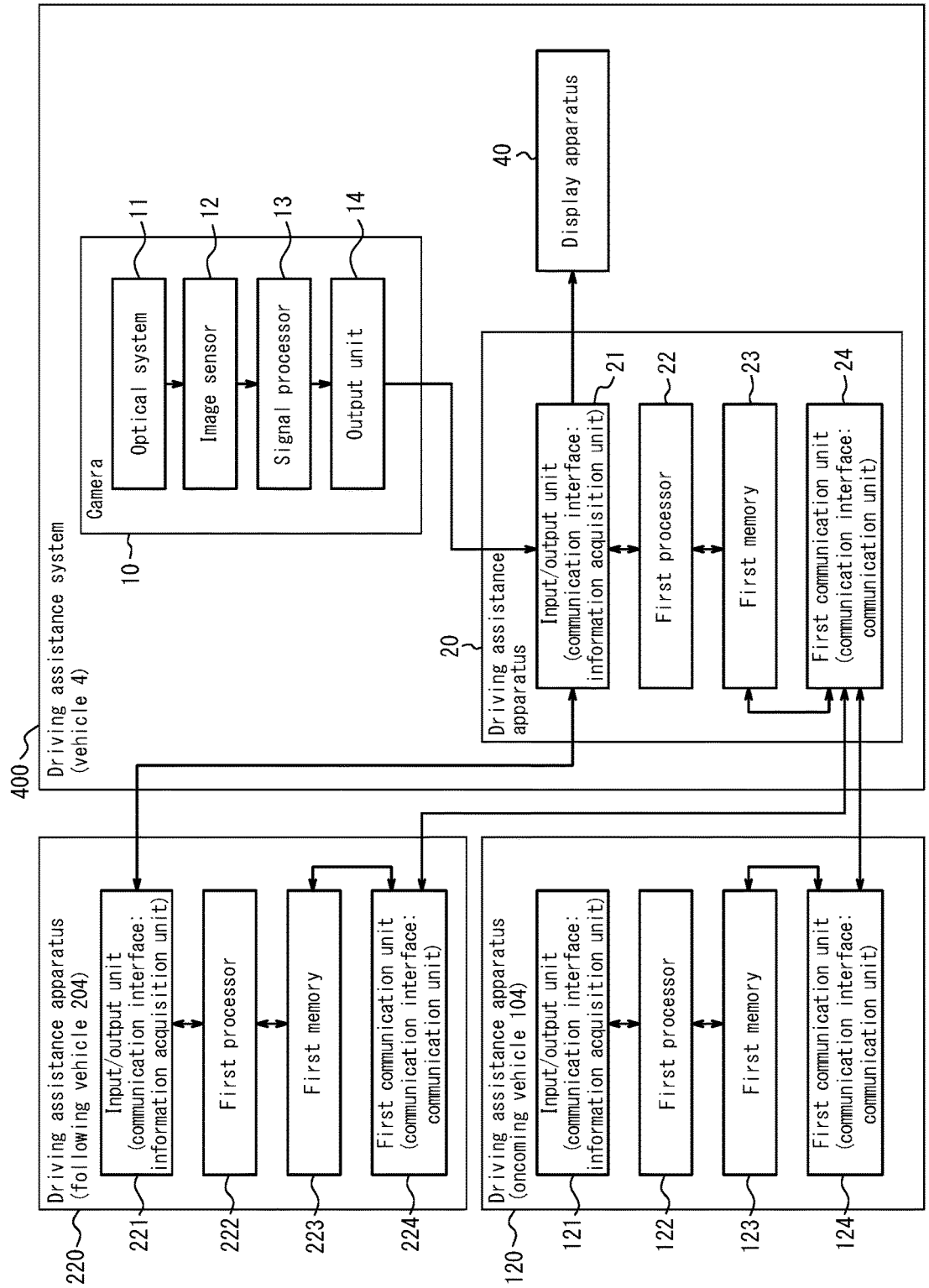
FIG. 15 is a block diagram illustrating the schematic configuration of a driving assistance system of a fourth embodiment.

As illustrated in FIG. 15, a driving assistance system 400 according to the fourth embodiment includes a camera 10, a driving assistance apparatus 20, a display apparatus 40, and so forth, like the driving assistance system 200 according to the second embodiment.

The driving assistance apparatus 20 of the fourth embodiment includes an input/output unit 21 (information acquisition unit), a first processor 22, a first memory 23, a first communication unit 24, and so forth, like the driving assistance apparatus 20 of the second embodiment.

Over a vehicle-to-vehicle communication network, the first communication unit 24 can transmit and receive information to and from a first communication unit 124 of a driving assistance apparatus 120 provided in an oncoming vehicle 104.

Over a vehicle-to-vehicle communication network, the first communication unit 24 can transmit and receive information to and from a first communication unit 224 of a driving assistance apparatus 220 provided in a following vehicle 204.

The first processor 22 can determine whether a following vehicle 204 that travels in the same direction as the vehicle 4 is present behind the vehicle 4. Any method may be used to determine the presence of the following vehicle 204, such as making a determination based on an image captured by the camera 10 photographing the area behind the vehicle 4.

When the first processor 22 determines that the vehicle 4 and the oncoming vehicle 104 cannot pass each other, and that a following vehicle 204 is present, the first communication unit 24 issues a request to the driving assistance apparatus 220 of the following vehicle 204 for transmission of passing information. The first communication unit 24 receives the passing information transmitted by the driving assistance apparatus 220 in response to the request. The passing information includes the current position of the following vehicle 204 and a third passable position Pp3 for the case of the following vehicle 204 backing up. The third passable position Pp3 is detected by the driving assistance apparatus 220.

The first processor 22 can determine the course of action based on the passing information received from the driving assistance apparatus 120 of the oncoming vehicle 104 and the passing information received from the driving assistance apparatus 220 of the following vehicle 204. In other words, the first processor 22 can determine whether the vehicle 4 and the oncoming vehicle 104 are to pass each other at the first passable position Pp1 and the third passable position Pp3, or at the second passable position Pp2.

Specifically, the first processor 22 calculates a driving distance L2 from the current position of the oncoming vehicle 104, included in the passing information received from the driving assistance apparatus 120, to the second passable position Pp2. The first processor 22 calculates a driving distance L3 from the current position of the following vehicle 204 to the third passable position Pp3. The first processor 22 then determines whether the vehicle 4 is to proceed or back up based on the driving distance L1 from the current position of the vehicle 4 to the first passable position Pp1, the driving distance L2, and the driving distance L3.

For example, the first processor 22 determines whether the sum of the driving distance L1 and the driving distance L3 is equal to or greater than the driving distance L2. When it is determined that the sum of the driving distance L1 and the driving distance L3 is equal to or greater than the driving distance L2, the first processor 22 outputs information, to the display apparatus 40, indicating that the vehicle 4 and the following vehicle 204 are to proceed, and the oncoming vehicle 104 is to back up. When it is determined that the sum of the driving distance L1 and the driving distance L3 is less than the driving distance L2, the first processor 22 outputs information, to the display apparatus 40, indicating that the vehicle 4 and the following vehicle 204 are to back up, and the oncoming vehicle 104 is to proceed. The algorithm that the first processor 22 uses to determine the course of action based on the driving distances L1, L2, and L3 is not limited to this example. The first processor 22 may make the determination using any algorithm.

The remaining structure and effects of the fourth embodiment are similar to those of the third embodiment. Hence, the same or corresponding constituent elements are labeled with the same reference signs, and a description thereof is omitted.

Next, a driving assistance method of the driving assistance system 400 of the fourth embodiment is described with reference to FIG. 16.

First, while the vehicle 4 is driving, the first processor 22 of the driving assistance apparatus 20 acquires a road width W1 of the road on which the vehicle 4 is driving based on an image captured by the camera 10 (step S701).

When the road width W1 is acquired in step S701, the first processor 22 determines whether the road width W1 is less than a predetermined threshold W1 th (step S702).

When it is determined in step S702 that the road width W1 is less than the predetermined threshold W1th (step S702: Y), the first memory 23 starts to store images captured by the camera 10 (step S703).

When images start to be stored in the first memory 23 in step S703, the first processor 22 acquires the road width W1, an object width W2, and a passable width W3 at predetermined intervals (such as 2 m intervals) for the road on which the vehicle 4 is driving and stores these values in the first memory 23 (step S704).

When the road width W1, the object width W2, and the passable width W3 are acquired in step S704, the first processor 22 performs processing to detect an oncoming vehicle 104 and determines whether an oncoming vehicle 104 is detected (step S705).

When an oncoming vehicle 104 is not detected in step S705, the first processor 22 repeats the processing in step S704 and step S705. When an oncoming vehicle 104 is detected in step S705, the first processor 22 determines whether the vehicle 4 and the oncoming vehicle 104 can pass each other (step S706).

When it is determined that the vehicle 4 and the oncoming vehicle 104 can pass each other (step S706: Y), the first processor 22 returns to step S704 and repeats the processing. At this time, the first processor 22 may output information indicating that passing is possible to the display apparatus 40 through the input/output unit 21, and the display apparatus 40 may display this information.

When it is determined in step S706 that the vehicle 4 and the oncoming vehicle 104 cannot pass each other (step S706: N), the first processor 22 extracts the first passable position Pp1 for the case of the vehicle 4 backing up from the driving history stored in the first memory 23. The first processor 22 then calculates the driving distance L1 from the current position to the first passable position Pp1 (step S707).

When it is determined in step S706 that the vehicle 4 and the oncoming vehicle 104 cannot pass each other, the first communication unit 24 issues a request, to the driving assistance apparatus 120 of the oncoming vehicle 104, for passing information and receives the passing information (step S708).

When it is determined in step S706 that the vehicle 4 and the oncoming vehicle 104 cannot pass each other, the first processor 22 determines whether a following vehicle 204 is present (step S709).

When it is determined in step S709 that the following vehicle 204 is present (step S709: Y), the first communication unit 24 issues a request to the driving assistance apparatus 220 of the following vehicle 204 for passing information including the third passable position Pp3 and receives the passing information (step S710).

When the passing information is received from the driving assistance apparatus 220 in step S710, the first processor 22 determines whether the sum of the driving distance L1 and the driving distance L3 is longer than the driving distance L2 (step S711). The driving distance L3 is the distance from the current position of the following vehicle 204 to the third passable position Pp3.

When the sum of the driving distance L1 and the driving distance L3 is determined to be longer than the driving distance L2 in step S711 (step S711: Y), the first processor 22 outputs information indicating that the vehicle 4 is to proceed to the display apparatus 40 through the input/output unit 21. The display apparatus 40 then displays the information indicating that the vehicle 4 is to proceed (step S712). The first communication unit 24 transmits information indicating that the vehicle 4 is to proceed to the driving assistance apparatus 120 and the driving assistance apparatus 220 (step S712). When the indication that the vehicle 4 is to proceed is displayed and transmitted in step S712, the first processor 22 returns to step S704 and repeats the processing.

Conversely, when the sum of the driving distance L1 and the driving distance L3 is determined to be equal to or less than the driving distance in step S711 (step S711: N), the first processor 22 determines whether the driving distance L1 is less than the driving distance L2 (step S713).

When the sum of the driving distance L1 and the driving distance L3 is determined to be less than the driving distance L2 in step S713 (step S713: Y), the first processor 22 outputs information indicating that the vehicle 4 is to back up to the display apparatus 40 through the input/output unit 21. The display apparatus 40 displays the information (step S714). The first communication unit 24 transmits information indicating that the vehicle 4 is to back up to the driving assistance apparatus 120 and the driving assistance apparatus 220 (step S714).

When the indication that the vehicle 4 is to back up is displayed by the display apparatus 40 and transmitted by the first communication unit 24 in step S714, the first processor 22 extracts the first passable position Pp1. The first processor 22 then outputs the extracted first passable position Pp1 to the display apparatus 40 through the input/output unit 21, and the display apparatus 40 displays the first passable position Pp1 (step S715).

When the sum of the driving distance L1 and the driving distance L3 is not less than the driving distance L2 in step S713, i.e. when the sum of the driving distance L1 and the driving distance L3 is determined to be equal to the driving distance L2 (step S713: N), the first communication unit 24 receives a passable width W32. The first processor 22 determines whether a passable width W31 at the first passable position Pp1 is longer than the passable width W32 (step S716).

When the passable width W31 is determined to be longer than the passable width W32 in step S716 (step S716: Y), the first processor 22 outputs information indicating that the vehicle 4 is to back up to the display apparatus 40 through the input/output unit 21. The display apparatus 40 then displays the information (step S714).

When the passable width W31 is determined to be less than the passable width W32 in step S716 (step S716: N), the first processor 22 outputs information indicating that the vehicle 4 is to proceed to the display apparatus 40 through the input/output unit 21, and the display apparatus 40 displays the information (step S712).

When the passable width W31 and the passable width W32 are determined to be equal in step S716, the first processor 22 may determine the course of action in accordance with whether a first statistical value is longer than a second statistical value. The first processor 22 may determine the course of action based on the number of following vehicles behind each of the vehicle 4 and the oncoming vehicle 104.

The first processor 22 may determine the course of action in step S716 based on the number of following vehicles or a statistical value of the passable width W3. The first processor 22 may instead determine the course of action by any method other than the above methods.

When a following vehicle 204 is determined not to be present in step S709 (step S709: N), the first processor 22 determines whether the driving distance L1 is longer than the driving distance L2 (step S717).

When the driving distance L1 is determined to be longer than the driving distance L2 in step S717, the first processor 22 outputs information indicating that the vehicle 4 is to proceed to the display apparatus 40 through the input/output unit 21. The display apparatus 40 then displays the information (step S718). When information indicating that the vehicle 4 is to proceed is displayed by the display apparatus 40 in step S718, the first processor 22 returns to step S704 and repeats the processing.

Conversely, when the driving distance L1 is determined to be equal to or less than the driving distance L2 in step S717, the first processor 22 determines whether the driving distance L1 is less than the driving distance L2 (step S719).

When the driving distance L1 is determined to be less than the driving distance L2 in step S719, the first processor 22 outputs information indicating that the vehicle 4 is to back up to the display apparatus 40 through the input/output unit 21. The display apparatus 40 then displays the information (step S720).

When the driving distance L1 is not less than the driving distance L2 in step S719, i.e. when the driving distance L1 is determined to be equal to the driving distance L2, the first communication unit 24 receives a passable width W32 at the second passable position Pp2 from the oncoming vehicle 104. The first processor 22 then determines whether a passable width W31 at the first passable position Pp1 is longer than the passable width W32 (step S721).

When the passable width W31 is determined to be longer than the passable width W32 in step S721, the first processor 22 outputs information indicating that the vehicle 4 is to back up to the display apparatus 40 through the input/output unit 21. The display apparatus 40 then displays the information (step S720).

When the passable width W31 is determined to be less than the passable width W32 in step S721, the first processor 22 outputs information indicating that the vehicle 4 is to proceed to the display apparatus 40 through the input/output unit 21, and the display apparatus 40 displays the information (step S718).

When the indication that the vehicle 4 is to back up is displayed by the display apparatus 40 in step S720, the first processor 22 extracts the first passable position Pp1. The first processor 22 then outputs the extracted first passable position Pp1 to the display apparatus 40 through the input/output unit 21, and the display apparatus 40 displays the first passable position Pp1 (step S715).

When the passable width W31 and the passable width W32 are determined to be equal in step S721, the first processor 22 may determine the course of action in accordance with whether a first statistical value is longer than a second statistical value. The first processor 22 may determine the course of action based on whether a vehicle is following the oncoming vehicle 104. The first processor 22 may instead determine the course of action by any method other than the above methods.

Figure 16:
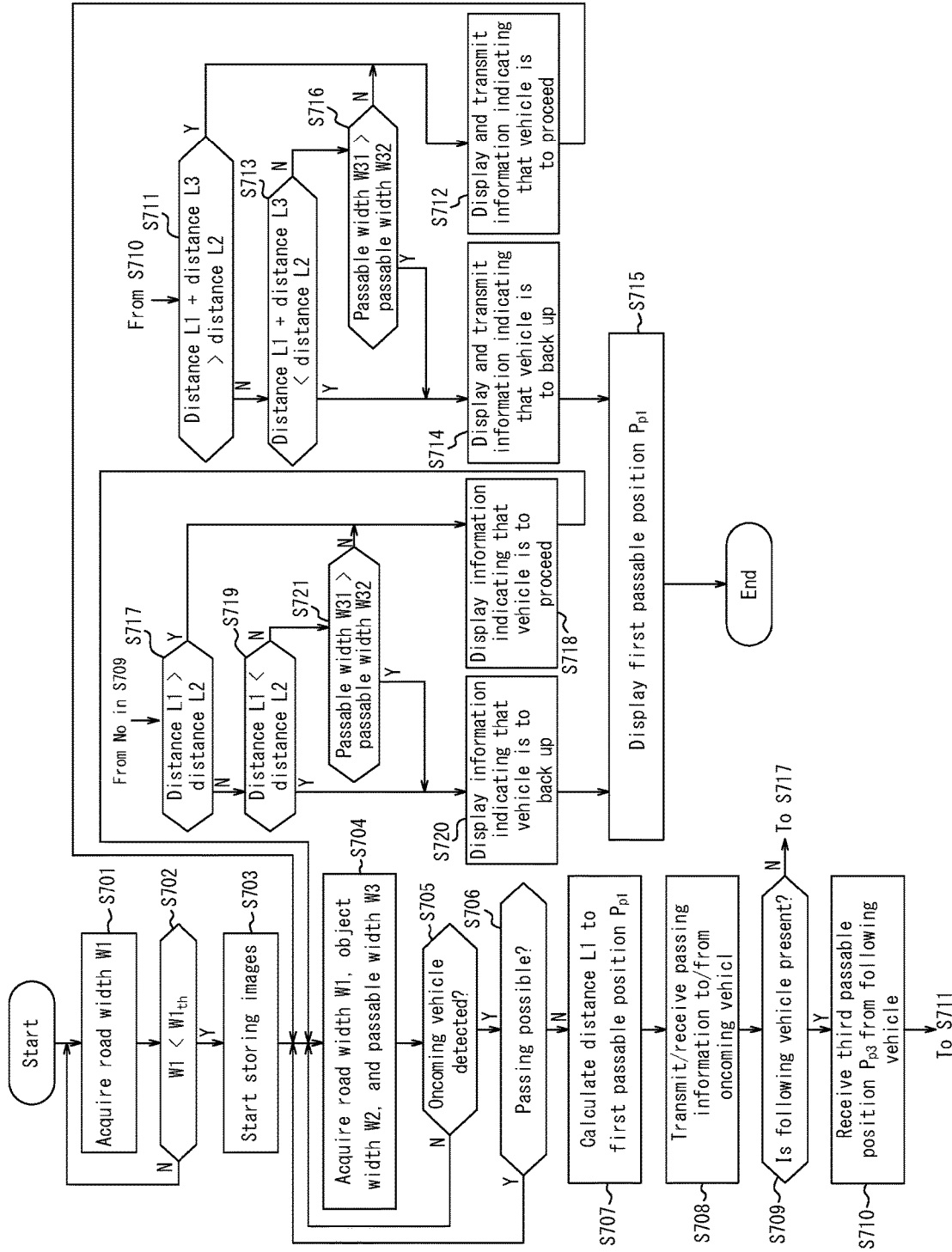
FIG. 16 is a flowchart illustrating an example of processing by the driving assistance system of the fourth embodiment.

The driving assistance apparatus 20 may be configured to execute the processing illustrated in FIG. 16 by reading a program stored on a non-transitory computer readable medium.

As described above, when an oncoming vehicle 104 is encountered on a narrow road and the vehicle 4 backs up, the driving assistance apparatus 20 of the fourth embodiment can extract the first passable position Pp1 based on conditions of the road on which the vehicle 4 has actually driven. This achieves similar effects to those of the second embodiment by allowing the driver to identify, at an early stage, the position at which the vehicle 4 and the oncoming vehicle 104 can definitely pass each other and to maneuver the vehicle 4 in reverse at ease.

When the vehicle 4 detects the oncoming vehicle 104 and the following vehicle 204, the driving assistance apparatus 20 of the fourth embodiment can determine whether the vehicle 4 and the following vehicle 204 should back up, or whether the oncoming vehicle 104 should back up, based on the driving distances L1, L2, and L3. The present embodiment can therefore identify the method that reduces the total displacement of the vehicle 4, the oncoming vehicle 104, and the following vehicle 204, allowing these vehicles to pass each other smoothly.

Fifth Embodiment

Next, a fifth embodiment of the present disclosure is described with reference to the drawings.

A driving assistance system 500 according to the fifth embodiment includes a camera 10, a driving assistance apparatus 20, a display apparatus 40, and so forth, like the driving assistance system 200 according to the second embodiment illustrated in FIG. 9.

The driving assistance apparatus 20 of the second embodiment acquires the road width W1, object width W2, and the like acquired during driving of the vehicle 4 and stores these, along with images captured by the camera 10, in the first memory 23 as driving path information. When an oncoming vehicle 104 is detected, the driving assistance apparatus 20 of the second embodiment extracts the first passable position Pp1 based on driving history that includes the driving path information and each position where an image pertaining to the driving path information was captured. However, the driving history stored in the first memory 23 by the driving assistance apparatus 20 of the fifth embodiment includes (i) driving path information that only includes images captured by the camera 10 during driving of the vehicle 4 and (ii) the positions at which the images were captured. When an oncoming vehicle 104 is detected, the driving assistance apparatus 20 of the fifth embodiment may acquire the road width W1, object width W2, passable width W3, and the like based on the images stored in the first memory 23 and extract the first passable position Pp1.

As described above, when an oncoming vehicle 104 is encountered on a narrow road and the vehicle 4 backs up, the driving assistance apparatus 20 of the fifth embodiment can extract the first passable position Pp1 based on conditions of the road on which the vehicle 4 has actually driven. This achieves similar effects to those of the second embodiment by allowing the driver to identify, at an early stage, the position at which the vehicle 4 and the oncoming vehicle 104 can definitely pass each other and to maneuver the vehicle 4 in reverse at ease.

During driving, the driving assistance apparatus 20 of the fifth embodiment acquires only images captured by the camera 10 during driving, without acquiring the road width W1, object width W2, and the like, and stores the images in the first memory 23. The first processor 22 acquires the road width W1, object width W2, and the like based on images stored in the first memory 23. Consequently, when the first processor 22 does not detect the oncoming vehicle 104 while the vehicle 4 is driving on a narrow road, the first processor 22 need not execute processing to acquire the road width W1, object width W2, and the like. This can reduce the processing load of the first processor 22.

The above embodiments have been described as representative examples. It will be apparent to those of ordinary skill in the art, however, that numerous modifications and substitutions may be made within the spirit and scope of the present disclosure. Therefore, the present disclosure should not be interpreted as being restricted to the above embodiments and examples. A variety of changes or modifications may be made without departing from the scope of the appended claims. For example, a plurality of the structural blocks described in the embodiments and examples may be combined into one, or one structural block may be divided into multiple parts.

The driving assistance apparatus 20 according to the first embodiment acquires nearby road information from the information processing apparatus 50 of the cloud 3 and generates information related to whether the nearby roads are passable. In the second to fifth embodiments, on the other hand, the driving assistance apparatus 20 calculates a region where the vehicle and an oncoming vehicle can pass each other based on the driving history stored in memory and information received from other vehicles. The processing of the first embodiment and the processing of the second embodiment may be executed by the same driving assistance apparatus 20 mounted in the same vehicle 4. In other words, the driving assistance apparatus 20 can be configured to assist with driving based on both information acquired from the external information processing apparatus 50 and information acquired by the respective vehicle 4 or other vehicles during driving.

In the third and fourth embodiments, the first communication unit 24 of the vehicle 4 transmits and receives information to and from the first communication unit 124 of an oncoming vehicle 104 and the first communication unit 224 of a following vehicle 204 over a vehicle-to-vehicle communication network, but this configuration is not limiting. The first communication unit 24 may, for example, transmit and receive information to and from the first communication unit 124 and the first communication unit 224 through a communication base station.

In the third and fourth embodiments, the first processor 22 determines whether the passing width that is the sum of the width W5 of the oncoming vehicle 104 and the width W6 of the vehicle 4 is less than the passable width W3 during the process to determine whether passing is possible. However, this configuration is not limiting. The first processor 22 may determine whether the sum of the width W5 of the oncoming vehicle 104, the width W6 of the vehicle 4, and the width required between the vehicle 4 and the oncoming vehicle 104 is less than the passable width W3.

In the third and fourth embodiments, the first communication unit 24 of the vehicle 4 receives the passing information of the oncoming vehicle 104 outputted by the first communication unit 124 of the oncoming vehicle 104, but this configuration is not limiting. The first communication unit 24 may, for example, receive the driving distance L2 calculated by the driving assistance apparatus 120 of the oncoming vehicle 104. In the fourth embodiment as well, the first communication unit 24 may receive the driving distance L3 calculated by the driving assistance apparatus 220 of the following vehicle 204 instead of the passing information of the following vehicle 204.

In the third and fourth embodiments, the display apparatus 40 displays the first passable position Pp1 after displaying an indication that the vehicle 4 is to back up, but this configuration is not limiting. The first processor 22 may, for example, output the information indicating that the vehicle 4 is to back up and the first passable position Pp1 simultaneously. The display apparatus 40 may then display these simultaneously.

When two or more following vehicles 204 are following the vehicle 4, or when a following vehicle 204 is following the oncoming vehicle 104, the first processor 22 in the fourth embodiment may determine the course of action based on information regarding the following vehicles 204.

In the above embodiments, the camera 10 and the driving assistance apparatus 20 are configured as separate components, but the camera 10 may be provided with the first processor 22 and the first memory 23 included in the driving assistance apparatus 20.

In the second to fifth embodiments, the road width W1, the object width W2, and the passable width W3 at a position P are included in the driving path information stored by the first memory 23, but this configuration is not limiting. The first memory 23 may, for example, store only the road width W1 and the object width W2 as the driving path information. In this case, after detecting an oncoming vehicle 104, the first processor 22 calculates the passable width W3 based on the road width W1 and the object width W2 stored in the first memory 23 and determines whether passing is possible.

In the above embodiments, the camera 10 outputs captured images of the road being driven on to the driving assistance apparatus 20 as driving path information. The driving assistance apparatus 20 generates road width information and object information using image recognition on the driving path information captured by the camera 10. However, embodiments of the present disclosure are not limited to this configuration. The signal processor 13 of the camera 10 may generate road width information and object information by image processing and transmit such information to the driving assistance apparatus 20. In this case, the road width information and object information outputted by the camera 10 become the driving path information. The camera 10 may process images and then transmit intermediate information that is at a stage before generation of the road width information and object information to the driving assistance apparatus 20 as the driving path information.

REFERENCE SIGNS LIST 1, 200, 300, 400 Driving assistance system
2 Imaging system
3 Cloud
4 Vehicle
4a First vehicle
4b Second vehicle
5 Network
10 Camera (imaging apparatus)
11 Optical system
12 Image sensor
13 Signal processor
14 Output unit
20 Driving assistance apparatus
21 Input/output unit (information acquisition unit/output unit)
22, 122, 222 First processor (processor)
23, 123, 223 First memory
24, 124, 224 First communication unit (communication unit)
30 Position sensor
40 Display apparatus
50 Information processing apparatus
51 Second communication unit
52 Second memory (storage)
53 Second processor
61 Road
62 Object
71 Driving path
72 Intersection
73 Left-turn path
74 Straight path
75 Right-turn path
76 Heavy-duty vehicle
77 Display screen
104 Oncoming vehicle
204 Following vehicle

The invention claimed is:

1. A driving assistance apparatus comprising:
a communication interface including an information acquisition unit configured to acquire information related to a position of a vehicle and road information related to a road and including driving path information; and
a processor configured to:
determine whether a width of the road is less than a predetermined value,
cause the information acquisition unit to start acquiring the driving path information when it is determined that the width of the road is less than the predetermined value, and
determine whether the road is passable based on the acquired information.

2. A driving assistance apparatus, comprising:
a communication interface configured to acquire information related to a position of a vehicle and road information related to a road; and
a processor configured to determine whether the road is passable based on the acquired information, wherein the communication interface comprises a communication unit; and wherein the processor is configured to generate first information indicating the position of the vehicle, to transmit the first information through the communication unit to an information processing apparatus external to the vehicle, receive third information from the information processing apparatus, the third information comprising nearby road information related to a nearby road near the position of the vehicle, and to generate warning information related to whether the nearby road is passable based on the third information.

3. The driving assistance apparatus of claim 2, wherein the communication interface comprises an information acquisition unit configured to acquire the road information, the road information including driving path information related to the road on which the vehicle is driving; and wherein the processor is configured to generate second information based on the driving path information and to transmit the second information to the information processing apparatus external to the vehicle.

4. The driving assistance apparatus of claim 3, wherein the information acquisition unit is configured to further acquire an acquisition time of the driving path information, and the communication unit is configured to transmit the acquisition time along with the second information to the information processing apparatus.

5. The driving assistance apparatus of claim 3, wherein the second information includes road width information of the road on which the vehicle is driving.

6. The driving assistance apparatus of claim 3, wherein the second information includes information indicating whether an object that could obstruct passage is present on the road on which the vehicle is driving, and information on a width of the object when the object is present.

7. The driving assistance apparatus of claim 6, wherein the second information further includes information indicating whether the object is moving.

8. The driving assistance apparatus of claim 3, wherein the processor is configured to cause the information acquisition unit to start acquiring the driving path information based on the third information.

9. The driving assistance apparatus of claim 8, wherein the third information includes a position on a road near the vehicle and road width information corresponding to the position on the road near the vehicle, and the processor is configured to cause the information acquisition unit to start acquiring the driving path information when the road width of the road on which the vehicle is driving becomes narrower than a predetermined width based on the third information.

10. The driving assistance apparatus of claim 2, further comprising an output unit, wherein the processor is configured to output the warning information to the output unit based on information related to whether the nearby road is passable.

11. The driving assistance apparatus of claim 2, wherein the third information includes object information and an acquisition time of the object information, the object information including a position of an object that could obstruct passage of the vehicle on the nearby road near the position of the vehicle, a width of the object, and information indicating whether the object is moving, and the processor is configured to generate the warning information related to whether the object obstructs passage of the vehicle based on the third information.

12. The driving assistance apparatus of claim 2, wherein the information processing apparatus is located on a cloud computing system.

13. A driving assistance apparatus, comprising:

a communication interface configured to acquire information related to a position of a vehicle and road information related to a road; and a processor configured to determine whether the road is passable based on the acquired information, wherein the communication interface comprises an information acquisition unit configured to acquire the road information, the road information including driving path information related to the road on which the vehicle is driving;

wherein the driving assistance apparatus further comprises a memory configured to store the information related to the position of the vehicle and the driving path information in association as a driving history; and wherein when the processor is configured to detect an oncoming vehicle ahead of the vehicle, the processor extracts a passable region where the vehicle and the oncoming vehicle can pass each other based on the driving history stored in the memory and outputs information pertaining to a first passable position that includes a position in the passable region.

14. The driving assistance apparatus of claim 13, wherein the processor extracts the passable region based on a width of the oncoming vehicle and a width and length of the vehicle.

15. The driving assistance apparatus of claim 13, wherein the information acquisition unit acquires an image of the road captured by a camera as the driving path information;

wherein the processor is configured to calculate a road width of the road on which the vehicle is driving based on the image;

wherein the memory is configured to store the road width calculated by the processor; and wherein when the processor detects the oncoming vehicle, the processor is configured to output the information pertaining to the first passable position based on the road width stored in the memory.

16. The driving assistance apparatus of claim 13, wherein the information acquisition unit acquires an image of the road captured by a camera;

wherein the memory is configured to store the image as the driving path information; and wherein when the processor detects the oncoming vehicle, the processor is configured to calculate a road width of each position of the road on which the vehicle is driving based on the image stored in the memory and to output the information pertaining to the first passable position based on the road width of the each position.

17. The driving assistance apparatus of claim 13, further comprising:

an input/output unit configured to input steering angle information representing a steering angle of the vehicle for vehicle positions during driving of the vehicle;

wherein the memory is further configured to store the steering angle information inputted by the input/output unit and the vehicle positions pertaining to the steering angle information in association as the driving path information; and wherein the processor is configured to output the vehicle positions from a current position of the vehicle to the first passable position and the steering angle information associated with the vehicle positions.

18. The driving assistance apparatus of claim 13,
wherein the communication interface further includes a communication unit configured to receive a second passable position from the oncoming vehicle when the processor detects the oncoming vehicle, the second passable position being a passable position when the oncoming vehicle backs up; and
wherein the processor determines whether the vehicle and the oncoming vehicle are to pass each other at the first passable position or the second passable position.

19. The driving assistance apparatus of claim 18,
wherein when the processor detects a following vehicle behind the vehicle after determining that the vehicle and the oncoming vehicle cannot pass each other, the communication interface is configured to receive, from the following vehicle, passing information including a third passable position where the oncoming vehicle and the following vehicle can pass each other when the following vehicle backs up; and
wherein the processor determines whether the vehicle and the oncoming vehicle are to pass each other at the first passable position or the second passable position based on the first passable position, the second passable position, and the third passable position.

20. An imaging apparatus comprising:
a lens;
an image sensor; and
a driving assistance apparatus comprising a communication interface including an information acquisition unit configured to acquire information related to a position of a vehicle and road information related to a road and including driving path information and a processor configured to determine whether a width of the road is less than a predetermined value, cause the information acquisition unit to start acquiring the driving path information when it is determined that the width of the road is less than the predetermined value, and determine whether the road is passable based on the information related to the position of the vehicle and the road information.

21. An imaging system for mounting in a vehicle, the imaging system comprising:
a position sensor configured to output information related to a position of the vehicle;
an imaging apparatus configured to capture an image of a road on which the vehicle is driving and to output road information related to the road including driving path information; and
a driving assistance apparatus comprising a communication interface including an information acquisition unit configured to acquire the information related to the position of the vehicle and the road information and a processor configured to determine whether a width of the road is less than a predetermined value, cause the information acquisition unit to start acquiring the driving path information when it is determined that the width of the road is less than the predetermined value, and determine whether the road is passable based on the information related to the position of the vehicle and the road information.

22. A driving assistance system comprising:
a plurality of driving assistance apparatuses mounted in a plurality of vehicles; and
an information processing apparatus external to the plurality of vehicles;
wherein each of the driving assistance apparatus of the plurality of driving assistance apparatuses comprises:
an information acquisition unit configured to acquire information related to a position of the vehicle in which each of the driving assistance apparatuses is mounted and driving path information related to a road on which the vehicle is driving;
a first processor configured to generate first information indicating the position of the vehicle and to generate second information based on the driving path information; and
a first communication unit configured to transmit the first information to the information processing apparatus in response to control by the first processor, to receive nearby road information related to a nearby road near the position of the vehicle as third information, and to transmit the second information to the information processing apparatus;
wherein the first processor generates information related to whether the nearby road is passable based on the third information; and
wherein the information processing apparatus comprises:
a second communication unit configured to receive the first information and the second information from a vehicle and to transmit the third information to the vehicle of the plurality of vehicles;
a storage configured to store a plurality of positions and nearby road information corresponding to each of the plurality of positions as fourth information; and
a second processor configured to acquire the first information from the second communication unit, and based on the position of the vehicle included in the first information, to extract the nearby road information related to the nearby road as the third information from the fourth information stored in the storage;
wherein the second processor updates the fourth information stored in the storage based on the first information and the second information received from the each driving assistance apparatus.

23. A vehicle comprising:
a driving assistance apparatus comprising a communication interface including an information acquisition unit configured to acquire information related to a position of the vehicle and road information related to a road including driving path information and a processor configured to determine whether a width of the road is less than a predetermined value, cause the information acquisition unit to start acquiring the driving path information when it is determined that the width of the road is less than the predetermined value, and determine whether the road is passable based on the information related to the position and the road information.

24. A driving assistance method for execution by a driving assistance apparatus, the driving assistance method comprising:
acquiring, using the driving assistance apparatus, information related to a position of a vehicle and road information related to a road including driving path information;
determining, using the driving assistance apparatus, whether a width of the road is less than a predetermined value;
starting, using the driving assistance apparatus, acquiring the driving path information when it is determined that the width of the road is less than the predetermined value, and determining, using the driving assistance apparatus, whether the road is passable based on the information related to the position and the road information.

\* \* \* \* \*